(12) United States Patent
Wright

(10) Patent No.: US 10,437,381 B2
(45) Date of Patent: Oct. 8, 2019

(54) METHOD AND APPARATUS FOR DISCRIMINATING BETWEEN USER INTERACTIONS

(71) Applicant: Cypress Semiconductor Corporation, San Jose, CA (US)

(72) Inventor: David G. Wright, San Mateo, CA (US)

(73) Assignee: Cyrpress Semiconductor Corporation, San Jose, CA (US)

( * ) Notice: Subject to any disclaimer, the term of this patent is extended or adjusted under 35 U.S.C. 154(b) by 72 days.

(21) Appl. No.: 15/849,204

(22) Filed: Dec. 20, 2017

(65) Prior Publication Data

US 2018/0113560 A1 Apr. 26, 2018

Related U.S. Application Data

(63) Continuation of application No. 11/904,576, filed on Sep. 26, 2007, now abandoned.

(60) Provisional application No. 60/880,983, filed on Jan. 17, 2007.

(51) Int. Cl.
*G06F 3/041* (2006.01)

(52) U.S. Cl.
CPC .................. *G06F 3/0416* (2013.01)

(58) Field of Classification Search
CPC ............................ G06F 3/0416; G06F 3/044
See application file for complete search history.

(56) References Cited

U.S. PATENT DOCUMENTS

| 4,293,734 | A | 10/1981 | Pepper |
| 5,796,827 | A | 8/1998 | Coppersmith et al. |
| 5,861,583 | A | 1/1999 | Schediwy et al. |
| 6,498,590 | B1 * | 12/2002 | Dietz ...................... G06F 3/038 323/904 |
| 6,633,306 | B1 | 10/2003 | März et al. |
| 7,232,068 | B2 | 6/2007 | Uchiyama et al. |
| 7,557,800 | B2 | 7/2009 | Yanagisawa |
| 2002/0185999 | A1 * | 12/2002 | Tajima .................... G06F 3/011 324/76.75 |

(Continued)

OTHER PUBLICATIONS

CSD User Module Data Sheet, Cypress Semiconductor Corporation CSD v 1.0, Oct. 23, 2006; 58 pages.

(Continued)

*Primary Examiner* — Liliana Cerullo

(57) ABSTRACT

Described herein is a car entertainment and navigation system that includes a user interface controller, a detecting circuit, and a selection circuit. The detecting circuit includes a selection circuit, capacitance-sensing circuitry to determine a location of a touch proximate to one or more electrodes of the touch screen display based on capacitance measurements of a plurality of electrodes of the touch screen made during a first mode of operation of the detecting circuit, and user-detecting circuitry to determine a location of a user corresponding to the touch based on signal measurements of a capacitively-coupled signal at the one or more electrodes made during a second mode of operation of the detecting circuit. The selection circuit is configurable to selectively couple the capacitance-sensing circuitry to the plurality of electrodes during the first mode and selectively coupling the user-detecting circuitry to the one or more electrodes during the second mode.

20 Claims, 15 Drawing Sheets

(56) References Cited

U.S. PATENT DOCUMENTS

| | | | |
|---|---|---|---|
| 2004/0056758 A1 | 3/2004 | Schwartz | |
| 2004/0155871 A1* | 8/2004 | Perski | G06F 3/041 345/174 |
| 2004/0158374 A1 | 8/2004 | Suzuki | |
| 2004/0268066 A1* | 12/2004 | Kelly | G06F 12/0804 711/159 |
| 2005/0044564 A1 | 2/2005 | Stopniewicz et al. | |
| 2006/0022959 A1* | 2/2006 | Geaghan | G06F 3/0416 345/173 |
| 2006/0028453 A1* | 2/2006 | Kawabe | G06F 3/041 345/173 |
| 2006/0122750 A1 | 6/2006 | Choi et al. | |
| 2006/0262048 A1 | 11/2006 | Yamada | |
| 2007/0063981 A1 | 3/2007 | Galyean et al. | |
| 2007/0109274 A1* | 5/2007 | Reynolds | G06F 3/041 345/173 |
| 2009/0040193 A1 | 2/2009 | Geaghan | |

OTHER PUBLICATIONS

Cypress Semiconductor Corporation, "CY8C21x34 Data Sheet," CSR User Module, CSR V.1.0; Oct. 6, 2005; 36 pages.
Mark Lee, "CapSense Best Practice", Cypress Application Note AN2394, Rev. **, Oct. 19, 2006, pp. 1-10.
Mark Lee, "The Art of Capacitive Touch Sensing," Cypress Perform, Published in Embedded.com (http://www.embedded.com), Mar. 2007, 10 pages.
PSoC Mixed-Signal Array, "Automotive: CY8C21334 and CY8C21534" Cypress Semiconductor Corp. 2005-2006—Document No. 38-12038 Rev. *B, Jan. 26, 2006. pp. 1-25.
USPTO Advisory Action for U.S. Appl. No. 11/904,576 dated Aug. 25, 2014; 3 pages.
USPTO Advisory Action for U.S. Appl. No. 11/904,576 dated Dec. 1, 2011; 3 pages.
USPTO Advisory Action for U.S. Appl. No. 11/904,576 dated Dec. 6, 2016; 3 pages.
USPTO Advisory Action for U.S. Appl. No. 11/904,576 dated Dec. 16, 2015; 2 pages.
USPTO Advisory Action for U.S. Appl. No. 14/751,061 dated Feb. 3, 2017; 3 pages.
USPTO Advisory Action for U.S. Appl. No. 14/751,061 dated May 25, 2016; 3 pages.
USPTO Final Rejection for U.S. Appl. No. 11/904,576 dated Jun. 18, 2014; 16 pages.
USPTO Final Rejection for U.S. Appl. No. 11/904,576 dated Sep. 21, 2016; 14 pages.
USPTO Final Rejection for U.S. Appl. No. 11/904,576 dated Sep. 27, 2017; 12 pages.
USPTO Final Rejection for U.S. Appl. No. 11/904,576 dated Oct. 5, 2015; 14 pages.
USPTO Final Rejection for U.S. Appl. No. 11/904,576 dated Oct. 7, 2011; 8 pages.
USPTO Final Rejection for U.S. Appl. No. 14/751,061 dated Mar. 30, 2016; 9 pages.
USPTO Final Rejection for U.S. Appl. No. 14/751,061 dated Oct. 3, 2017; 11 pages.
USPTO Final Rejection for U.S. Appl. No. 14/751,061 dated Nov. 17, 2016; 10 pages.
USPTO Non-Final Rejection for U.S. Appl. No. 11/904,576 dated Jan. 31, 2014; 11 pages.
USPTO Non-Final Rejection for U.S. Appl. No. 11/904,576 dated Apr. 19, 2017; 11 pages.
USPTO Non-Final Rejection for U.S. Appl. No. 11/904,576 dated May 9, 2016; 14 pages.
USPTO Non-Final Rejection for U.S. Appl. No. 11/904,576 dated May 10, 2011; 5 pages.
USPTO Non-Final Rejection for U.S. Appl. No. 11/904,576 dated Jun. 4, 2015; 14 pages.
USPTO Non-Final Rejection for U.S. Appl. No. 11/904,576 dated Dec. 3, 2010; 6 pages.
USPTO Non-Final Rejection for U.S. Appl. No. 14/751,061 dated Jun. 14, 2017; 9 pages.
USPTO Non-Final Rejection for U.S. Appl. No. 14/751,061 dated Aug. 26, 2015; 9 pages.
USPTO Non-Final Rejection for U.S. Appl. No. 14/751,061 dated Nov. 5, 2015; 8 pages.
USPTO Requirement for Restriction for U.S. Appl. No. 11/904,576 dated Aug. 18, 2010; 5 pages.

* cited by examiner

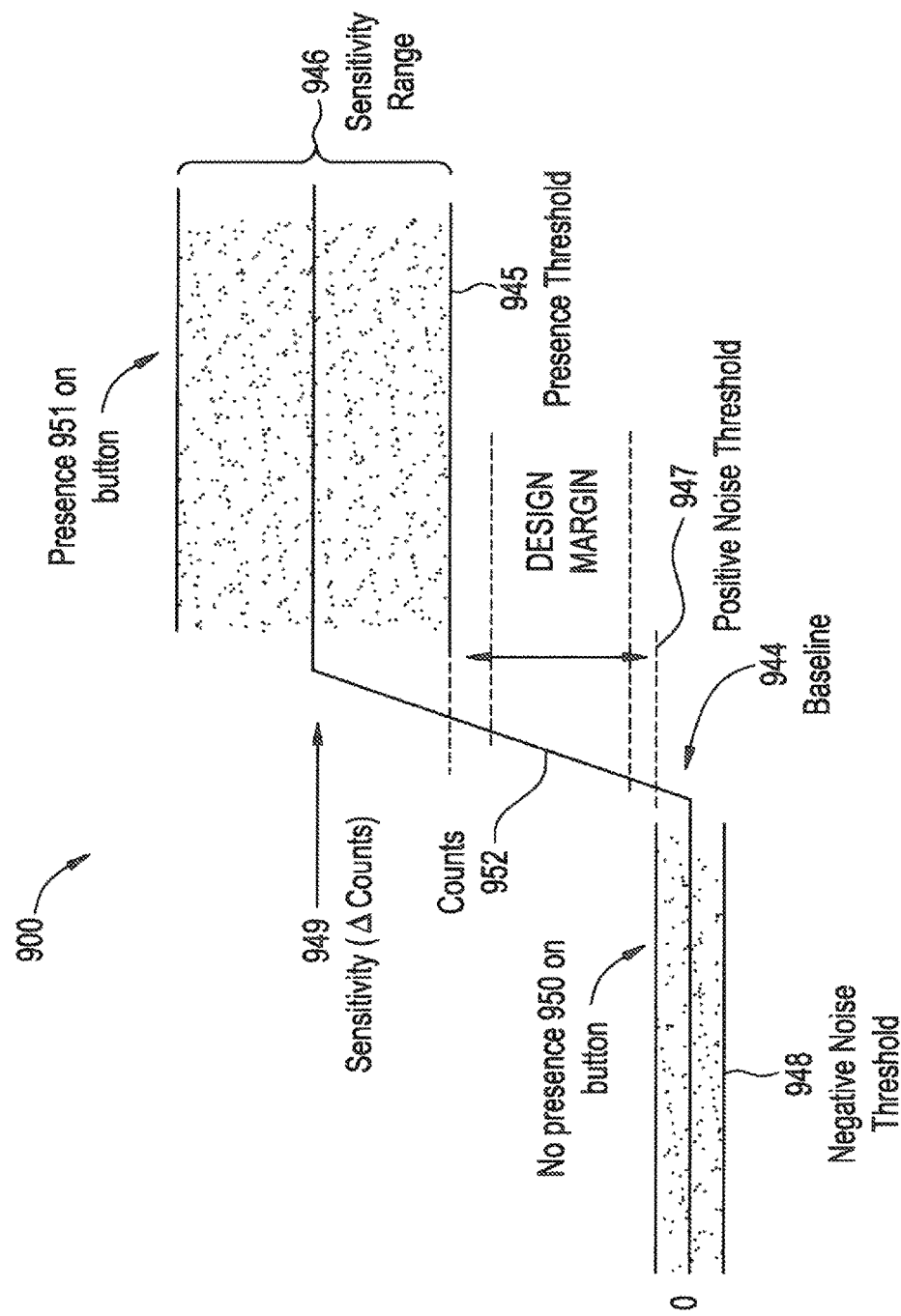

METHOD AND APPARATUS FOR DISCRIMINATING BETWEEN USER INTERACTIONS

RELATED APPLICATIONS

This application is a continuation of U.S. application Ser. No. 11,904,576, filed on Sep. 26, 2007, which claims the benefit of U.S. Provisional Application No. 60/880,983, filed Jan. 17, 2007, all which are incorporated by reference in their entirety.

TECHNICAL FIELD

The present invention relates generally to a user interface (UI) device and, more particularly, to a touch-sensor device.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

One type of touch pad operates by way of capacitance sensing utilizing capacitive sensors. The capacitance detected by a capacitive sensor changes as a function of the proximity of a conductive object to the sensor. The conductive object can be, for example, a conductive stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

Another user interface device that has become more common is a touch screen. Touch screens, also known as touch screens, touch panels, or touch screen panels are display overlays which are typically either pressure-sensitive (resistive), electrically sensitive (capacitive), acoustically-sensitive (SAW—surface acoustic wave) or photosensitive (infra-red). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point of sale systems, on automated teller machines (ATMs), on mobile handsets, on kiosks, on game consoles, on PDAs where a stylus is sometimes used to manipulate the graphical user interface (GUI) and to enter data, and in automobile liquid crystal displays (LCDs).

Conventional user interface devices, however, do not have the ability to limit an operator at a certain location from interacting with a user interface of the device. Also, conventional user interface devices do not have the ability to provide one type of interaction with a user in one location, and a different interaction for another user in a different location, for example, a user in a driver seat and a passenger in a passenger seat in a car. These conventional devices are not configured to determine who has pressed a button (e.g., on a capacitive sensor or touch screen) in order to, for example, prevent the driver from accessing navigation functions while the car is in motion, but allow the passenger to operate those same controls.

BRIEF DESCRIPTION OF THE DRAWINGS

The present invention is illustrated by way of example, and not by way of limitation, in the figures of the accompanying drawings.

FIG. 9A illustrates a graph of a sensitivity of a single touch-sensor button.

DETAILED DESCRIPTION

Figure 1:
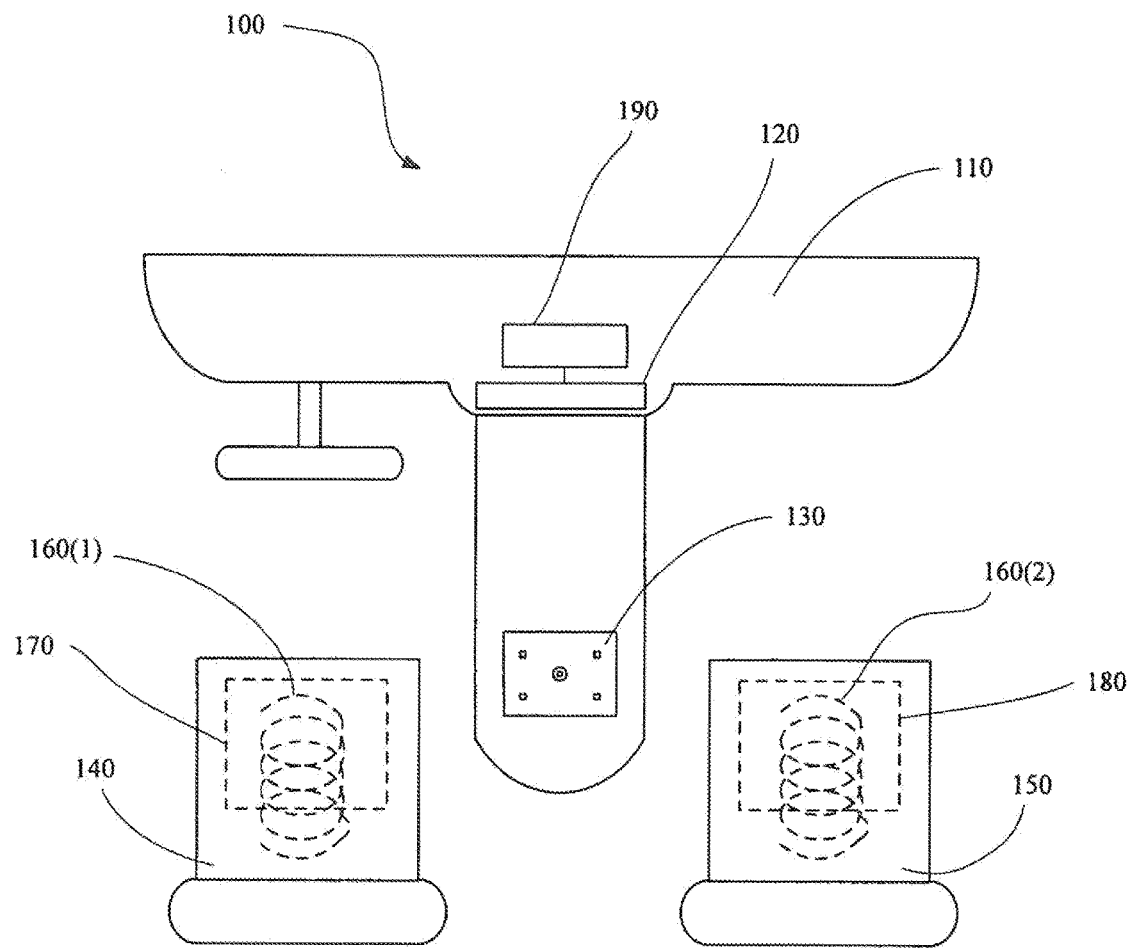
FIG. 1 illustrates a car entertainment and navigation system in accordance with one embodiment of the present invention.

Described herein are apparatuses and methods for discriminating between a first signal from a user interface indicative of interaction at a first location and a second signal indicative of interaction at a second location. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

A method and an apparatus for detecting which of multiple operators, or the same operator at multiple locations, has activated a user interface are described. In an exemplary embodiment, the user location discriminating method and apparatus may be utilized with a button (e.g., capacitive sensing or touch screen) on a display within a vehicle (e.g. an automobile) to prohibit the driver, for example, from entering a destination address in a navigation system while the car is in motion, but allow a passenger to enter such information without requiring a physically separate set of controls accessible only to the passenger. In another exemplary embodiment, an automobile display system may include an LCD display with two different images displayed at two different viewing angles (e.g., to display a navigation system to the driver and a movie to the passenger). Touch screen (or other technology) controls are made to be user sensitive, so that a passenger gets, for example, pause, fast forward, etc.

while the driver gets navigation controls, all on the same screen and even, in one embodiment, with touch screen buttons in the same place on the screen.

In one embodiment, the user discriminating method includes generating and applying a signal having a frequency onto the body of each user (e.g., driver, passenger, etc.) and detecting that frequency when the user touches the control (touch screen, capacitive sense button, etc). The user discriminating apparatus may also include a drive circuit for generating and applying an electrical signal onto the users' bodies. For example, a conductor or loop is provided in each seat, or each seatbelt, or floor mat, etc, that is coupled to the drive circuit in order to apply the electrical signal onto the bodies of the users.

Although the user discriminating method and apparatus are discussed herein in relation to automobile systems, the user discriminating method and apparatus may be used with other devices in other types of applications. For example, the users could be standing on a mat and interacting with a UI in order to gain entry through a secured door. Embodiments of the present invention are applicable to any situation where multiple users are accessing a UI, and have some defined position relative to the UI and a different frequency can be generated and applied to each users body depending on their location. It should be noted that the user discriminating method and apparatus may also be used with other, non-capacitive sensing, types of buttons and switches.

Figure 2A:
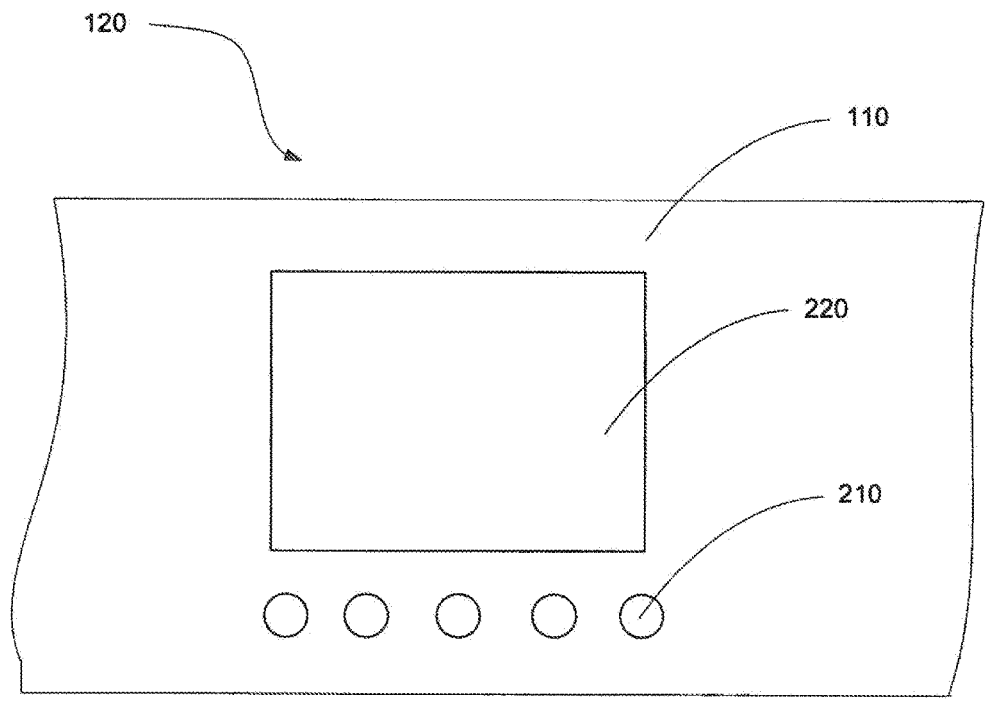
FIG. 2A illustrates a plan view of a car interior including components associated with one embodiment of the apparatus of the present invention.

FIG. 1 illustrates a car entertainment and navigation system in accordance with one embodiment of the present invention. In one embodiment, the car entertainment & navigation system 100 may include a dashboard area 110 having a user interface 120 (e.g., touch screen display, touch-sensor buttons, touch-sensor slider, touch-sensor pad, or the like). The user interface 120 is coupled to a processing device 190, described in more detail below. In one embodiment, as illustrated in FIG. 2A, the user interface 120 includes a display 220 disposed in the dashboard area 110, as well as multiple touch-sensor buttons 210. Alternatively, the user interface 120 may include other combinations of similar or dissimilar types of user interfaces. The display screen 220 (e.g., display screen or touch screen) may be used to display some or all of entertainment functions (e.g., radio channel, RDS information, CD name, track number, track name, etc.), navigation functions (e.g., map, destination address, current location, estimated time of arrival, etc.), communications functions (e.g., mobile phone dialing) and general car functions (e.g., number of miles to next service, estimated range with current amount of fuel, etc).

Figure 2B:
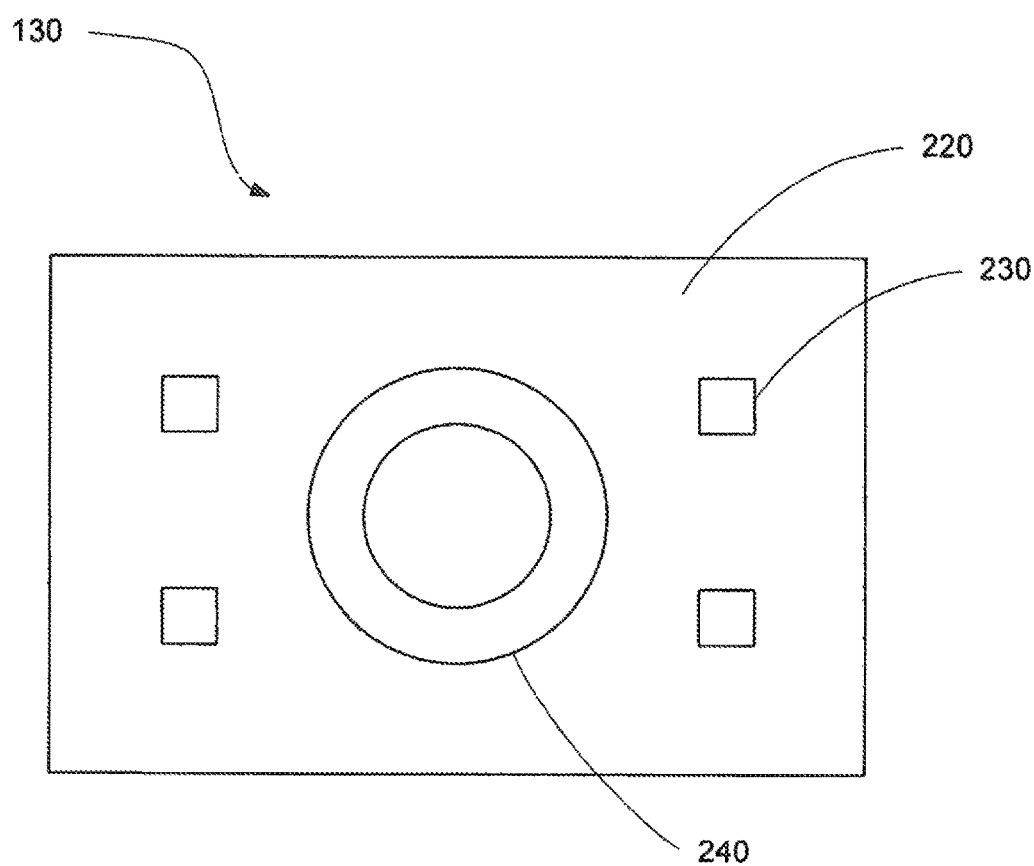
FIG. 2B illustrates a plan view of a car interior including components associated with one embodiment of the apparatus of the present invention.

The car entertainment & navigation system 100 may also include a console area 130 having other user interfaces, such as capacitive sense sliders, non-capacitive sensing buttons (e.g., mechanical buttons, photo-sensitive buttons, etc.) and other types of controls, as shown in FIG. 1. In one embodiment, as illustrated in more detail in FIG. 2B, the console area 130 includes a user interface 220 that includes a touch-sensor slider 240, also known as a capacitive sense slider, and multiple non-capacitive sensing buttons 230, which may be, for example, mechanical buttons, photo-sensitive buttons, or the like. Alternatively, the user interface 220 may include other combinations of similar or dissimilar types of user interfaces, such as capacitive sense buttons, sliders, touch pads, touch screens, or the like. In one embodiment, the touch-sensor slider 240 is a selection control of an automobile control system. The touch-sensor slider 240 may be used in automotive vehicles, such as on the dashboard area 110, or console area 130, and may include a manually-operated dial and display for use in connection with onboard engine controls, stability controls, braking controls, energy controls, audio features, display features, lighting features, and comfort-control features. Alternatively, the touch-sensor slider 240 is another type of control user interface to perform other types of operations.

Different interaction between the user interface (e.g., the user interface 120 or 220) and multiple users may be required. In particular, the response to at least one type of interaction with the interface (e.g., a capacitive sense button, a touch screen button, a mechanical button, etc.) is required to be different depending on which of two or more operators (or two or more locations of the same operator) originates the interaction. For example, when the car is moving, the driver may be locked out from accessing some or all navigation functions such as entering a new destination address while the car is in motion.

In one embodiment, a first user (e.g., driver) is located in a driver seat 140, and a second user (e.g., passenger) is located in a passenger seat 150. The first user interacts with the user interface 120 at the first location, and the second user interacts with the user interface 120 at the second location. The processing device 190 is configured to discriminate between interaction at the first location and interaction at the second location, for example, to distinguish between the first and second users at the first and second locations, respectively. In one embodiment, the processing device includes a detecting circuit that is configured to receive a first signal and a second signal from the user interface indicative of interaction at the first location and at the second location, In one embodiment, a first user (e.g., driver) is located in a driver seat 140, and a second user (e.g., passenger) is located in a passenger seat 150. The first user interacts with the user interface 120 at the first location, and the second user interacts with the user interface 120 at the second location. The processing device 190 is configured to discriminate between interaction at the first location and interaction at the second location, for example, to distinguish between the first and second users at the first and second locations, respectively. In one embodiment, the processing device includes a detecting circuit that is configured to receive a first signal and a second signal from the user interface indicative of interaction at the first location and at the second location, respectively. The detecting circuit may also be configured to distinguish between the first signal and the second signal. In another embodiment, the detecting circuit is configured to receive additional inputs from other systems, such as inputs from the speedometer of the car, or the like. For example, the detecting circuit when receiving the first signal from the first user, based on a type of operation, the detecting circuit can check the speed from the speedometer input to determine that the car is in motion to reject or allow the type of operation.

In one embodiment, the driver seat 140 includes a first drive circuit 170 that is configured to generate the first signal indicative of interaction at the first location. The first drive circuit 170 is coupled to a coil 160(1) that is disposed in the driver seat 140. Similarly, the passenger seat 150 includes a second drive circuit 180 that is configured to generate the second signal indicative of interaction at the second location. The second drive circuit 180 is coupled to a coil 160(2) that is disposed in the passenger seat 150. The first drive circuit 170 is configured to apply the first signal to a body of the first user at the first location (e.g., driver seat) through, for example, the coil 160(1) installed in the driver seat 140. The processing device 190 is configured to receive the first signal through the body of the first user when the first user interacts with the user interface 120 at the first location. Similarly, the second drive circuit 180 is configured to apply the second signal to a body of the second user at the second location (e.g., passenger seat) through, for example, the coil 160(2) installed in the passenger seat 150. Alternatively, the second drive circuit 180 is configured to apply the second signal to the body of the first user at the second location (e.g., passenger seat). The processing device 190 is configured to receive the second signal through the body of the second user when the second user interacts with the user interface 120 at the second location. As described above, the processing device 190 is configured to discriminate between the first signal and the second signal to determine which user is interacting with the user interface 120.

In another embodiment, the first drive circuit 170 is disposed in one of the two locations and generates the first and second signals indicative of interactions at the first and second locations, respectively. The processing device 190 is configured to receive the first and second signals through the bodies of the first and second users when the first and second users interact with the user interface 120 at the first and second locations, respectively. Alternatively, more than two drive circuits may be used for additional locations.

In another embodiment, the user interface 130 is coupled to the processing device 190. Similar to the embodiments described above, the processing device 190 may be configured to discriminate between multiple signals received from one or more users at multiple locations. For example, the processing device 190 is configured to receive a first signal and a second signal indicative of interaction at a first location (e.g., driver seat 140) and at a second location (e.g., passenger seat 150), respectively, and to discriminate between the first and second signals corresponding to the first and second locations, respectively.

Figure 3A:
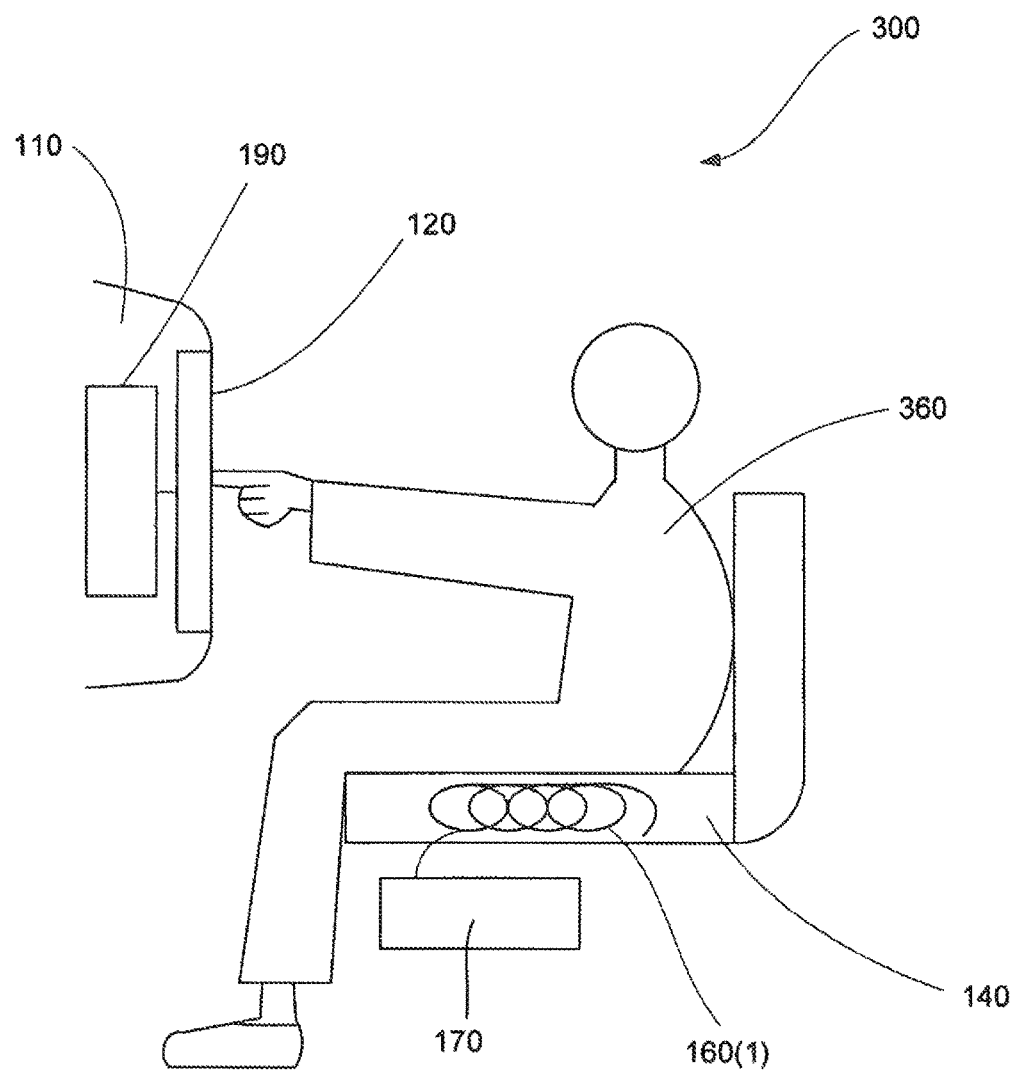
FIG. 3A conceptually illustrates a principle of operation of a user location discriminating method and apparatus in accordance with one embodiment of the present invention.

FIG. 3A conceptually illustrates a principle of operation of a user location discriminating method and apparatus in accordance with one embodiment of the present invention. Environment 300 is representative of a car environment, in which a first user 360 sits on the driver seat 140. The first drive circuit 170 is installed in or surrounding the driver seat 140. The first drive circuit 170 is coupled to the coil 160(1), which is installed in the driver seat 140. In one embodiment, the coil is a loop of conductive material that is disposed in the seat of the driver seat 140. The first drive circuit 170 generates a first signal, using, for example, an oscillator having a first frequency (e.g., 250 Hz), and applies the first signal to the body 360 of the first user by way of the coil 160(1) in the driver seat 140. Similarly, a second drive circuit 180 may be installed in the passenger seat 150, and coupled to another coil 160(2) installed in the passenger seat 150 (not illustrated). The second drive circuit 180 generates a second signal, using, for example, an oscillator having a second frequency (e.g., 350 Hz), and applies the second signal to the body of the second user by way of the coil 160(2) in the passenger seat 150. When the first user interacts with the user interface 120, the first signal generated by the first drive circuit 170 is received at the processing device 190 through the user interface 120. As such, the first signal is indicative of an interaction with the user interface 120 at the first location. Similarly, when the second user interacts with the user interface 120, the second signal generated by the second drive circuit 180 is received at the processing device 190 through the user interface 120; and, as such, the second signal is indicative of an interaction with the user interface 120 at the second location. As described above, the processing device 190 is configured to discriminate between the first and second signals, and, as such, may be configured to discriminate between interactions from multiple users.

Alternatively, the first and second drive circuits 170 and 180 and the coils 160(1) and 160(2) are disposed in other locations in the car. For example, the coil 160(1) may be disposed in a car mat, or in another piece of equipment that contacts the user, such as, for example, a seatbelt. It should be noted that the coils, as described herein do not need to be in contact with the user, but alternatively, may be in close proximity to the user to induce a voltage onto the body of the user.

Although the embodiments described above are implemented in a car, alternatively, the embodiments described herein may be used in other environments in which multiple users interact with the same interface to discriminate between the multiple users, such as in other types of vehicles, terminals, kiosks, or the like.

Figure 3B:
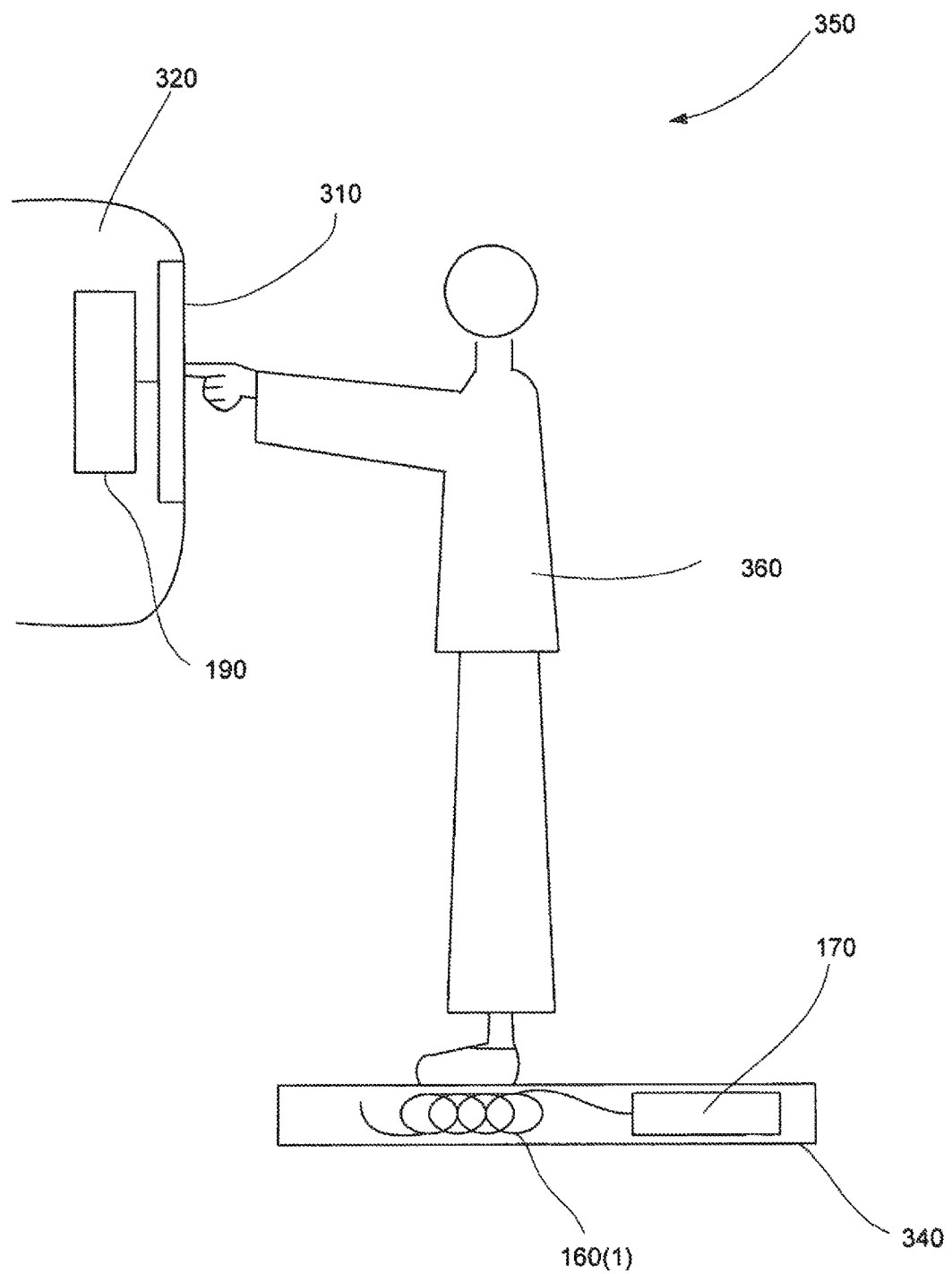
FIG. 3B conceptually illustrates a principle of operation of a user location discriminating method and apparatus in accordance with another embodiment of the present invention.

FIG. 3B conceptually illustrates a principle of operation of a user location discriminating method and apparatus in accordance with another embodiment of the present invention. The user location discriminating method and apparatus in FIG. 3B is implemented in environment 350, for example, at a terminal used to gain entry through a secured door, in which the first user is standing on the floor 340. The coil 160(1) and the first drive circuit 170 are installed on the floor 340. When the user stands in the first location, the body 360 of the first user makes contact with the coil 160(1). The first drive circuit 170 generates the first signal and applies the first signal through the body 360 of the first user. At a second location of the environment 350, the second drive circuit 180 may be installed to generate the second signal and to be applied to the body of another user by way of a second coil 160(2) (not illustrated). The user interface 310, which may be, for example, a touch screen, is installed in a display case 320 and is coupled to the processing device 190. In other embodiments, the user interface 310 may be other types of user interfaces and may be installed in other structures, such as a wall, a floor, a stand, a kiosk, or the like. As described above, with respect to FIG. 3A, the processing device 190 receives signals corresponding to the locations of the users and discriminates between the received signals to determine which user is interacting with the user interface. For example, when the first user makes contact with the user interface 310, the processing device 190 receives the first signal through the body 360 of the first user and through the user interface 310. That is, the first signal generated by the first drive circuit 170 is propagated through the body 360 to the user interface 310 when the first user interacts with the user interface 310.

Figure 3C:
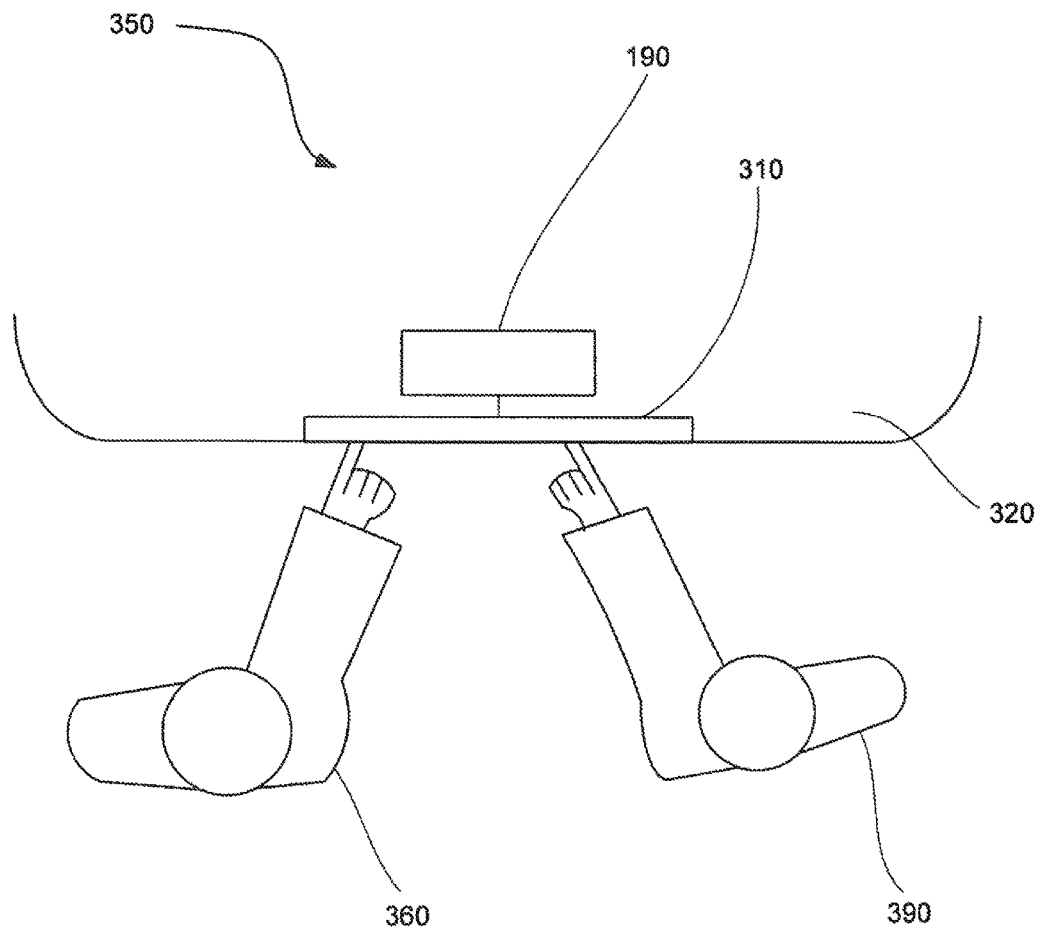
FIG. 3C conceptually illustrates a principle of operation of a user location discriminating method and apparatus in accordance with another embodiment of the present invention.

As described above, other drive circuits may be installed in other locations with respect to the display case 320, as illustrated in FIG. 3C, which illustrates a top view of the environment 350 of FIG. 3B. In this embodiment, the first user is disposed in a first location relative to the display case 320, and the second user is disposed in a second location relative to the display case 320. As described above with respect to FIG. 3B, the processing device 190 receives the first signal through the body 360 of the first user when the first user interacts with the user interface 310. The processing device 190 also receives the second signal through the body 390 of the second user when the second user interacts with the user interface 310. The processing device 190 is configured to discriminate between the first and second signals received through the user interface 310 by the first and second users. Additional locations and signals may also be used to discriminate between user locations, as well as to discriminate between users.

Figure 4:
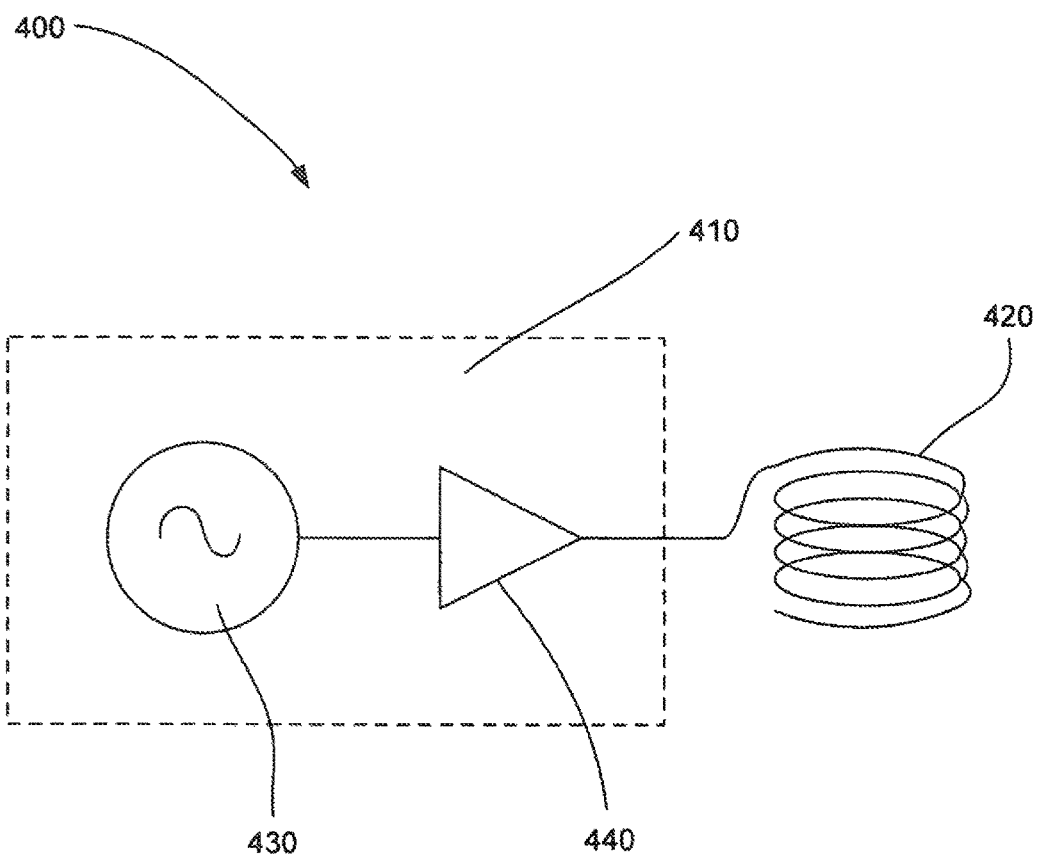
FIG. 4 illustrates a drive circuit in accordance with one embodiment of the present invention.

FIG. 4 illustrates a signal generator circuit 400 in accordance with one embodiment of the present invention. The signal generator 400 includes an oscillator 430 coupled to an amplifier 440, which is coupled to a coil 420. The oscillator 430 and amplifier 440 may be part of a drive circuit 410. In another embodiment, the drive circuit 410 includes an oscillator 430, but not an amplifier 440. Alternatively, the signal generator circuit 400 may include other types of circuits used to generate one or more signals having similar or dissimilar frequencies.

In one embodiment, the drive circuit 410 is disposed at a first location and the coil 420 is disposed in another location. In another embodiment, the drive circuit 410 and the coil 420 are disposed in the same location or in close proximity to one another. For example, in one embodiment, the drive circuit 410 is disposed below a seat of a car, and the coil 160(1) is disposed in the seat to make contact with the user.

In one embodiment, the signal generator circuit 400 generates a first signal with a first frequency and applies the first signal to a first user at a first location through the coil 420. In another embodiment, the signal generator circuit 400 generates both a first signal with a first frequency and a second signal with a second frequency, and applies the first signal to the first user at the first location through a first coil and the second signal to a second user at a second location through a second coil.

In another embodiment, the signal generator circuit 400 generates a carrier signal having a carrier frequency at the first and second locations. The signal generator circuit 400 modulates onto the carrier signal, at the first location, a first signal with a first frequency corresponding to the first location, and modulates onto the carrier signal, at the second location, a second signal with a second frequency corresponding to the second location. The processing device, which receives the carrier signal, demodulates the carrier signal to detect either the first frequency or the second frequency to discriminate between the first and second signals.

Figure 5:
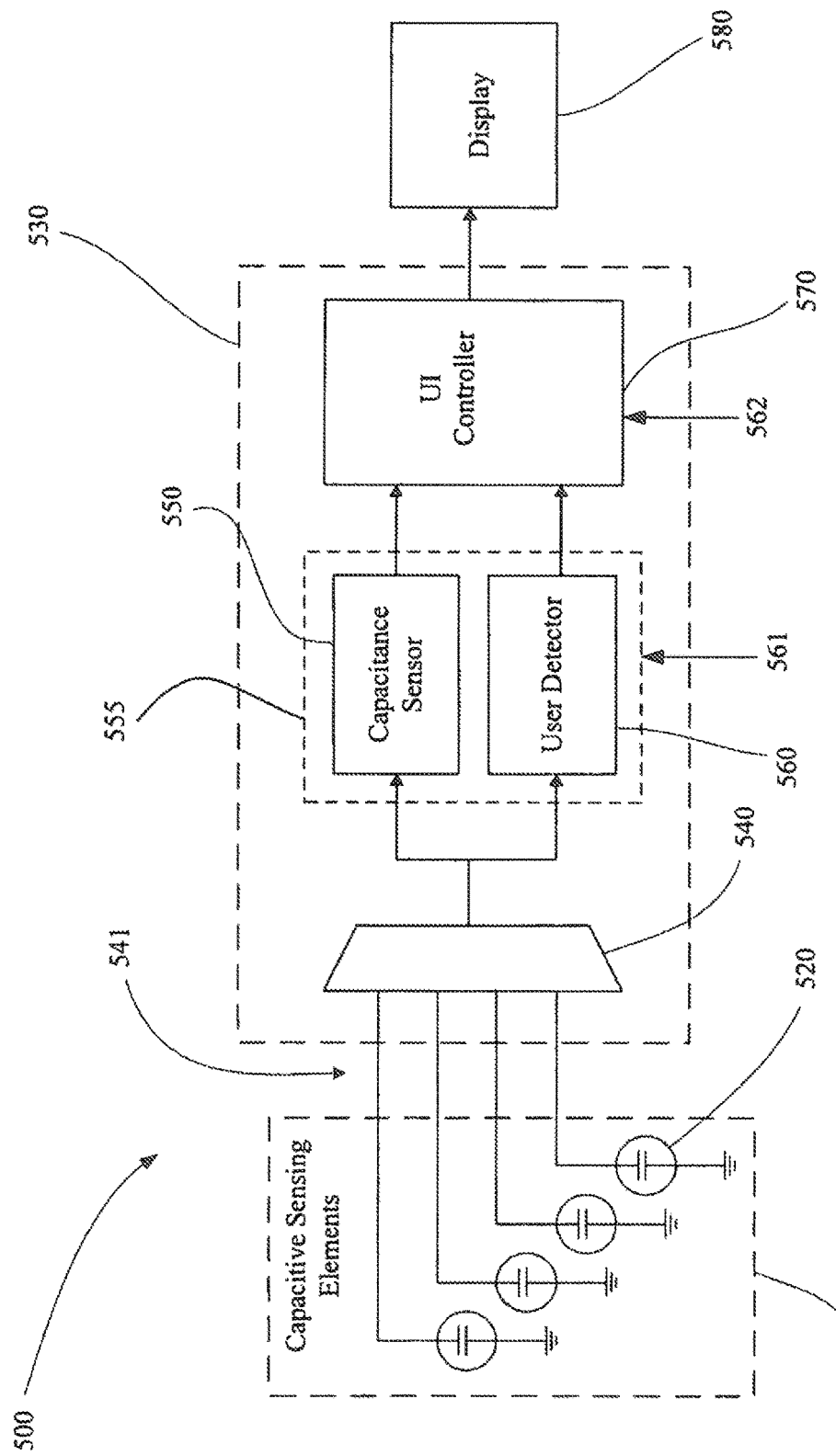
FIG. 5 illustrates a user location discriminating apparatus having a capacitance sensor and a user detector circuit in accordance with one embodiment of the present invention.

FIG. 5 illustrates a user location discriminating apparatus 500 having a capacitance sensor 550 and a user detector circuit 560 in accordance with one embodiment of the present invention. The user location discriminating apparatus 500 is coupled to a user interface 510 having multiple capacitive sensing elements 520. The user location discriminating apparatus 500 is also coupled to a display 580. The user interface 510 may be, for example, a touch panel having one or more touch-sensor buttons, a touchpad, a touch-sensor slider, a touch screen, or the like.

The discriminating apparatus 500 includes a selection circuit 540, a detecting circuit 555, and a UI controller 570. The selection circuit 540 is coupled to the capacitive sensing elements 520 by an analog bus 541 and to the detecting circuit 555. In one embodiment, the selection circuit 540 is a multiplexer. Alternatively, other types of selection circuits may be used. The detecting circuit 555 is configured to receive through the selection circuit 540 multiple signals indicative of user interaction at multiple locations. In another embodiment, the detecting circuit is configured to receive additional inputs 561 from other systems, such as inputs from the speedometer of the car, general car functions, or the like. Alternatively, the additional inputs 562 (e.g., general car functions) may be received by the UI controller 570. The detecting circuit 555 includes a capacitance sensor 550, which is configured to receive a signal representative of the interaction with the user interface 510 at a first location or at a second location. The signal is representative of the capacitance measured on the user interface 510. The capacitance sensor 550 is configured to detect, for example, a presence of a conductive object on the user interface 510, as well as other interactions on the user interface 510.

The detecting circuit 555 includes a user detector circuit 560, which is configured to receive multiple signals through the user interface 510 and to discriminate between the multiple signals corresponding to user interaction at multiple locations. In one embodiment, the user detector circuit 560 is a frequency detector circuit. The frequency detector circuit may include a phase-locked loop (PLL) circuit, a tone detector, or the like, to detect a frequency of the received signal. The frequency detector circuit is configured to receive the multiple signals corresponding to multiple locations and discriminate between multiple frequencies of the received signals. In another embodiment, the frequency detector circuit comprises a demodulator that is configured to demodulate a carrier frequency to detect a modulated frequency on the carrier frequency. The modulated frequency corresponds to a specific location of the user interaction. The frequency detector circuit uses the modulated frequency to discriminate between the received signals to determine from which location the user interaction is performed. It should be noted that the detector circuit 500 may include more or fewer components as described above, to detect a signal and to discriminate the signal from other signals received through the user interface, such as an amplifier to condition the received signals for the PLL or tone detector.

The detecting circuit 555 is used to detect the frequency of a signal that is received through the user interface 510 when the user touches the controls (e.g., touch screen, capacitive sense buttons, etc.) of the user interface 510. In another embodiment, the detecting circuit 555 includes only the capacitance sensor 550. In addition to detecting interaction on the user interface 510, such as detecting a presence of a conductive object, the capacitance sensor 550 is configured to receive multiple signals and to discriminate between the received signals. For example, the capacitance sensor 550 is configured to receive a first signal and a second signal corresponding to the first location and the second location, respectively. In this embodiment, the first signal is representative of a first capacitance of a first user at the first location and the second signal is representative of a second capacitance of a second user (or the first user) at the second location. The capacitance sensor 550 uses the first capacitance to determine that the first user is interacting with the user interface 510, and uses the second capacitance to determine that the second user is interacting with the user interface 510.

In one embodiment of a discriminating apparatus that includes a capacitive sense button, the capacitance sensor 550 operates in two modes: a touch sensing mode and a user sensing mode. When a touch is detected, it would then be reconfigured to sense the particular signal corresponding to the particular location. Alternatively, two circuits could each be connected to the same control, as illustrated in FIG. 5. The discriminating apparatus 500 in FIG. 5 may include multiple capacitive sensing elements that may be selectively coupled (e.g., using the illustrated selection circuit 540) to the capacitance sensor 550 and the user detector circuit 560. Both the capacitance sensor 550 and the user detector circuit 560 are coupled to the UI controller 570 which is coupled to the user interface on the display 580 of the system. In one embodiment, both the capacitance sensor 550 and the user detector circuit 560 could operate simultaneously. Alternatively, the capacitance sensor 550 and the user detector circuit 560 operate sequentially.

In one embodiment, the selection circuit 540 is configured to sequentially select the individual sensor elements 520. In another embodiment, the selection circuit 540 is configured to sequentially select sets of sensor elements, such as rows or columns. The selection circuit 540 may be configured to provide charge current or voltage to the selected sensor elements and to measure a capacitance on the selected sensor elements. In one exemplary embodiment, the selection circuit 540 is a multiplexer array. Alternatively, the selection circuit may be other circuitry inside or outside the capacitance sensor 550 to select the sensor element(s) to be measured.

In another embodiment, the capacitance sensor 550 may be used to measure capacitance on all or less than all of the sensor elements of the user interface 510. Alternatively, multiple capacitance sensors 550 may be used to measure capacitance on all or less than all of the sensor elements of the user interface 510. In one embodiment, the selection circuit 540 is configured to connect the sensor elements that are not being measured to the system ground. This may be done in conjunction with a dedicated pin in the GPIO port 607.

The processing device 530 is coupled the UI controller 570. In one embodiment, the UI controller 570 includes a decision logic block. The operations of decision logic block may be implemented in firmware; alternatively, it may be implemented in hardware or software. The decision logic block may be configured to receive the digital code or counts from the capacitance sensor 550, and to determine the state of the user interface 510, such as whether a conductive object is detected on or in proximity to the user interface 510, which button has been pressed on the user interface 510, from which location the user is interacting with the user interface 510, or the like.

Figure 6:
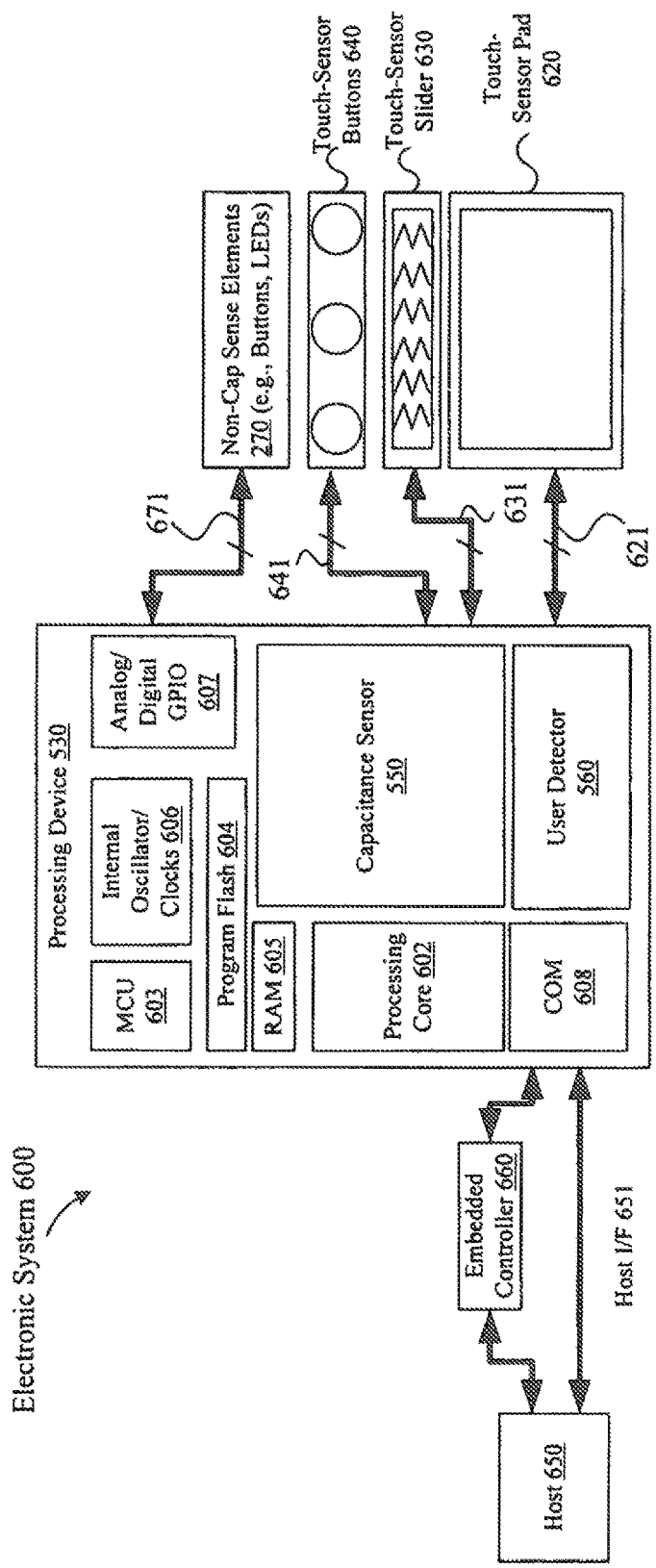
FIG. 6 illustrates a block diagram of one embodiment of an electronic system having a processing device for detecting a presence of a conductive object and for discriminating between a first signal indicative of interaction at a first location and a second signal indicative of interaction at a second location.

In another embodiment, instead of performing the operations of the decision logic in the UI controller 570, the processing device 530 may send the raw data to the host 650. Host 650, as illustrated in FIG. 6, may include decision logic block. The operations of the decision logic of the host 650 may also be implemented in firmware, hardware, and/or software. Also, as described below, the host may include high-level APIs in applications that perform routines on the received data, such as compensating for sensitivity differences, other compensation algorithms, baseline update routines, start-up and/or initialization routines, interpolations operations, scaling operations, or the like. The operations described with respect to the decision logic of the UI controller 570 may be implemented in a decision logic block of the host 650, applications running on the host 650, or in other hardware, software, and/or firmware external to the processing device 530.

In another embodiment, the processing device 530 may also include a non-capacitance sensing actions block. This block may be used to process and/or receive/transmit data to and from the host 650. For example, additional components may be implemented to operate with the processing device 530 along with the user interface 510 (e.g., keyboard, keypad, mouse, trackball, LEDs, displays, or the like).

In an alternative embodiment of the invention, a single frequency may be used in a controlled manner when it is applied. For example, normally there is no signal applied to the users at the multiple locations. When the user interface 510 is pressed, a selected frequency is applied to the first user at the first location (e.g., driver seat). Then, a test may be performed to see if the selected frequency can be detected. The selected frequency may also be applied the second user at the second location (e.g., passenger seat) and tested to see if it can be detected.

In another embodiment, a single frequency can be used that is modulated by different modulated signals. For example, a 250 Hz signal may be used all the time in both controls, but with the signal turned on and off in different patterns (e.g., on for 10 ms, off for 20 ms vs. on for 20 ms and off 10 ms) depending on the seat (e.g., driver or passenger). In one embodiment, a carrier frequency (either the same for all users or different for each user) may be used with a distinct-frequency signal (e.g., AM or FM) modulated onto the carrier frequency corresponding to the respective locations. Such an embodiment may help prevent spurious detection. In particular, the greater the complexity of the signal being detected, the less the chance of spurious detection. For example, detecting a simple tone (e.g., 250 Hz) is susceptible to spurious detection any time there is any other 250 Hz signal present in the user interface environment (e.g., surrounding the user and/or the sensor elements within the user interface). Modulating the signals onto the carrier signal makes it less likely that such a spurious detection would occur because the other signal would have to be modulated in the same way. Starting and stopping the signal, and checking that the signal detection comes and goes as the signal comes and goes makes spurious detection even less likely. In general, such "closed loop" sensing methods may be more reliable than "open loop" sensing.

In alternative embodiments, other apparatus and methods may be used to discern which of multiple operators, or the same operator at multiple locations, has activated a user interface. Another such method may involve utilizing different paths to ground at the different user locations, and ensuring that those paths had different impedances to ground. In one embodiment, the impedance of each path to ground may be dynamically varied in order to modulate the detected sensor capacitive counts in a way that could be detected by a capacitance sensor, and, thus, used to identify which of the users was activating the control. In such an embodiment, the capacitance sensor may be a capacitive sensor relaxation oscillator (CSR). With a CSR oscillator, the capacitance is measured in terms of raw counts (e.g., the higher the capacitance, the higher the raw counts) during periods of oscillation of the relaxation oscillator. More specifically, when a finger or conductive object is placed on a capacitive sensor, the capacitance increases and an output signal of the relaxation oscillator decreases. The relaxation oscillator output signal is fed to a digital counter for measurement, or counting, using techniques known in the art.

A reference, or baseline, may be tracked (e.g., using software in a processing device within the UI control circuitry) and established for each different impedance path location, so that the system knows when a user interaction at a particular location is present (e.g., finger on button) by comparing the CSR raw counts (representing the capacitance due to the presence of a conductive object, such as a user's finger) with the baseline for a particular location. Alternatively, the CSR raw counts may be compared against multiple thresholds corresponding to multiple locations, respectively. In one embodiment, the baseline and thresholds are configured before use by the user. For example, upon purchasing a car implementing the car entertainment and navigation system 100, the user configures the system to specific users in multiple locations. For example, a presence threshold (e.g., finger threshold) for a first user sitting in the driver seat 140 is set and a presence threshold for a second user sitting in the passenger seat 150 is also set. Alternatively, the baseline and thresholds may be dynamically configured during operation.

At startup (or boot) the sensor elements 520 are scanned and the digital code or count values for each sensor element with no activation are stored as a baseline array ($C_P$). The presence of a finger on the sensor element or in proximity to the sensor element is determined by the difference in counts between a stored value for no sensor element activation and the acquired value with sensor element activation, referred to here as $\Delta n$. The sensitivity of a single sensor element is approximately:

$$\frac{\Delta n}{n} = \frac{C_F}{C_P} \quad (1)$$

The value of $\Delta n$ should be large enough for reasonable resolution and a clear indication of sensor element activation (e.g., button activation). This drives sensor element construction decisions. $C_F$ should be as large a fraction of $C_P$ as possible. Since $C_F$ is determined by finger area and distance from the finger to the sensor element's conductive traces (through the over-lying insulator), the baseline capacitance $C_P$ should be minimized. The baseline capacitance $C_P$ includes the capacitance of the sensor element pad plus any parasitics, including routing and chip pin capacitance.

In one embodiment, a first baseline is measured and stored for a first user at a first location and a second baseline is measured and stored for a second user at a second location. Based on the first and second baselines, the processing device 530 is configured to discriminate between the first and second users at first and second locations, respectively. For example, the first baseline measurement may be tuned to a greater number of raw counts, so that the capacitance measured corresponding to the first user can be discriminated from the capacitance measured corresponding to the second user. In one embodiment, a circuit is installed at the first location to provide the additional capacitance to the user when the user interacts with the user interface. The additional capacitance applied to the user at one of the locations may be used to discriminate between the first and second signals received through the user interface.

In one embodiment, the signal generator circuit 400 is configured to generate an additional capacitance to one of the locations. For example, the first drive circuit 170 is configured to generate an additional capacitance that is applied to the body 360 of the first user. When the first user touches the user interface the additional capacitance (e.g., the capacitance in addition to the first capacitance of the first user), the processing device 530 is configured to discriminate the first signal corresponding to interaction with the user interface 510 at the first location from the second signal corresponding to interaction with the user interface 510 at the second location. Alternatively, other configurations may be used to generate an additional capacitance to be measured at one of the locations of the user interface 510.

It should be noted that while a CSR oscillator is described, any oscillator type that translates capacitance chances to raw count changes may be used. For example, the capacitance sensor 550 may implement other capacitance measurement methods, such as sigma-delta modulation, successive approximation, versus voltage phase shift measurement, resistor-capacitor charge timing, capacitive bridge divider, charge transfer, charge-accumulation circuits, or the like. It should be noted, however, instead of evaluating the raw counts relative to a threshold, the capacitance sensor may be evaluating other measurements to determine the user interaction. For example, in the capacitance sensor having a sigma-delta modulator, the capacitance sensor is evaluating the ratio of pulse widths of the output, instead of the raw counts being over a certain threshold.

FIG. 6 illustrates a block diagram of one embodiment of an electronic system 600 having a processing device 530 for detecting a presence of a conductive object and for discriminating between a first signal indicative of interaction at a first location and a second signal indicative of interaction at a second location. Electronic system 600 includes processing device 530 (which includes the detecting circuit 555), touch-sensor pad 620, touch-sensor slider 630, touch-sensor buttons 640, host processor 650, embedded controller 660, and non-capacitance sensor elements 670. The processing device 530 may include analog and/or digital general purpose input/output ("GPIO") ports 607. GPIO ports 607 may be programmable. GPIO ports 607 may be coupled to a Programmable Interconnect and Logic ("PIL"), which acts as an interconnect between GPIO ports 607 and a digital block array of the processing device 530 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 530 may also include memory, such as random access memory (RAM) 605 and program flash 604. RAM 605 may be static RAM (SRAM) or the like, and program flash 604 may be a non-volatile storage, or the like, which may be used to store firmware (e.g., control algorithms executable by processing core 602 to implement operations described herein). Processing device 530 may also include a memory controller unit (MCU) 603 coupled to the memory and the processing core 602.

The processing device 530 may also include an analog block array (not illustrated). The analog block array is also coupled to the system bus. Analog block array also may be configured to implement a variety of analog circuits (e.g., ADC, analog filters) using, in one embodiment, configurable UMs. The analog block array may also be coupled to the GPIO 607.

In one embodiment, the processing device 530 also includes the user detector circuit 560, as described above. In another embodiment, the processing device 530 does not include the user detector circuit 560, and the processing device 530 is configured to discriminate between the interaction of a user with the user interface at the first and second locations using the capacitance sensor 550.

As illustrated, capacitance sensor 550 may be integrated into processing device 530. Capacitance sensor 550 may include analog 1/0 for coupling to an external component, such as touch-sensor pad 620, touch-sensor slider 630, touch-sensor buttons 640, and/or other devices.

It should be noted that the embodiments described herein are not limited to a specific type of user interface, such as a touch screen for entertainment and navigation implementations in a car, but can be used in other capacitive sensing implementations, for example, the sensing device may be a touch-sensor pad 620, a touch-sensor slider 630, or a touch-sensor button 640 (e.g., capacitance sensing button). It should also be noted that the embodiments described herein may be implemented in other sensing technologies than capacitive sensing technologies, such as resistive, optical imaging, surface acoustical wave (SAW), infrared, dispersive signal, and strain gauge technologies. Similarly, the operations described herein are not limited to car control operations but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.), mechanical buttons, handwriting recognition and numeric keypad operation, or the like.

In one embodiment, the electronic system 600 includes a touch-sensor pad 620 coupled to the processing device 530 via bus 621. Touch-sensor pad 620 may include a two-dimension sensor array. The two-dimension sensor array includes multiple sensor elements, organized as rows and columns.

In another embodiment, the electronic system 600 includes a touch-sensor slider 630 coupled to the processing device 530 via bus 631. Touch-sensor slider 630 may include a single-dimension sensor array. The single-dimension sensor array includes multiple sensor elements, organized as rows, or alternatively, as columns.

In another embodiment, the electronic system 600 includes touch-sensor buttons 640 coupled to the processing device 530 via bus 641. Touch-sensor button 640 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 640 has a single sensor element to detect the presence of the conductive object. In one embodiment, the touch-sensor button 640 may be a capacitance sensor element.

The electronic system 600 may include any combination of one or more of the touch screen (not illustrated in FIG. 6), touch-sensor pad 620, touch-sensor slider 630, and/or touch-sensor button 640. In another embodiment, the electronic system 600 may also include non-capacitance sensor elements 670 coupled to the processing device 530 via bus 671. The non-capacitance sensor elements 670 may include buttons, light emitting diodes (LEDs), and other user interface devices, such as a mouse, a keyboard, a display, or other functional keys that do not require capacitance sensing. In one embodiment, buses 671, 641, 631, and 621 may be a single bus. Alternatively, these buses may be configured into any combination of one or more separate buses.

Processing device 530 may include internal oscillator/clocks 606 and communication block 608. The oscillator/clocks block 606 provides clock signals to one or more of the components of processing device 530. Communication block 608 may be used to communicate with an external component, such as a host processor 650, via host interface (I/F) 651. Alternatively, processing block 530 may also be coupled to embedded controller 660 to communicate with the external components, such as host 650. Interfacing to the host 650 can be through various methods. In one exemplary embodiment, interfacing with the host 650 may be done using a standard interface to connect to an embedded controller 660, which in turn sends data to the host 650 via a low pin count (LPC) interface. In one exemplary embodiment, interfacing may be done using a universal serial bus (USB) interface directly coupled to the host 650 via host interface 651. Alternatively, the processing device 530 may communicate to external components, such as the host 650 using industry standard interfaces, such as USB, PS/2, inter-integrated circuit (I2C) bus, system packet interfaces (SPI), or the like. The host 650 and/or embedded controller 660 may be coupled to the processing device 530 with a ribbon or flex cable from an assembly, which houses the sensing device and processing device.

In one embodiment, the processing device 530 is configured to communicate with the embedded controller 660 or the host 650 to send and/or receive data. The data may be a command or alternatively a signal, such as commands defined by HID class drivers already built into the Operating System (OS) software of host 650. Alternatively, the processing device 530 may be configured to communicate with the embedded controller 660 or the host 650, using non-OS drivers, such as dedicated touch-sensor pad drivers, or other drivers known by those of ordinary skill in the art.

In one embodiment, the processing device 530 is configured to communicate data (e.g., commands or signals) using hardware, software, and/or firmware, and the data may be communicated directly to the processing device of the host 650, such as a host processor, or alternatively, may be communicated to the host 650 via drivers of the host 650, such as OS drivers, or other non-OS drivers. It should also be noted that the host 650 may directly communicate with the processing device 530 via host interface 651.

In one embodiment, the data sent to the host 650 from the processing device 530 includes click, double-click, movement of the pointer, scroll-up, scroll-down, scroll-left, scroll-right, step Back, and step Forward. In another embodiment, the data sent to the host 650 includes the position or location of the conductive object on the sensing device. Alternatively, other user interface device commands may be communicated to the host 650 from the processing device 530. These commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

Processing device 530 may reside on a common carrier substrate such as, for example, an integrated circuit (IC) die substrate, a multi-chip module substrate, or the like. Alternatively, the components of processing device 530 may be one or more separate integrated circuits and/or discrete components. In one exemplary embodiment, processing device 530 is a Programmable System on a Chip (PSoC®) processing device, developed by Cypress Semiconductor Corporation, San Jose, Calif. Alternatively, processing device 530 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 530 may also be done in the host. In another embodiment, the processing device 530 is the host.

In one embodiment, the method and apparatus described herein may be implemented in a fully self-contained user interface, which outputs fully processed x/y movement and gesture data signals or data commands to a host. In another embodiment, the method and apparatus may be implemented in a user interface, which outputs x/y movement data and also finger presence data to a host, and where the host processes the received data to detect gestures. In another embodiment, the method and apparatus may be implemented in a user interface, which outputs raw capacitance data to a host, where the host processes the capacitance data to compensate for quiescent and stray capacitance, and calculates x/y movement and detects gestures by processing the capacitance data. Alternatively, the method and apparatus may be implemented in a user interface, which outputs pre-processed capacitance data to a host, where the touchpad processes the capacitance data to compensate for quiescent and stray capacitance, and the host calculates x/y movement and detects gestures from the pre-processed capacitance data. Alternatively, other configurations are possible.

Capacitance sensor 550 may be integrated into the processing device 530, or alternatively, in a separate IC. Alternatively, descriptions of capacitance sensor 550 may be generated and compiled for incorporation into other integrated circuits. For example, behavioral level code describing capacitance sensor 550, or portions thereof, may be generated using a hardware description language, such as VHDL or Verilog, and stored to a machine-accessible medium (e.g., Flash ROM, CD-ROM, hard disk, floppy disk, etc.). Furthermore, the behavioral level code can be compiled into register transfer level ("RTL") code, a netlist, or even a circuit layout and stored in a machine-accessible medium. The behavioral level code, the RTL code, the netlist, and the circuit layout all represent various levels of abstraction to describe capacitance sensor 550.

It should be noted that the components of electronic system 600 may include all the components described above. Alternatively, electronic system 600 may include only some of the components described above or include additional components not listed herein.

Figure 8:
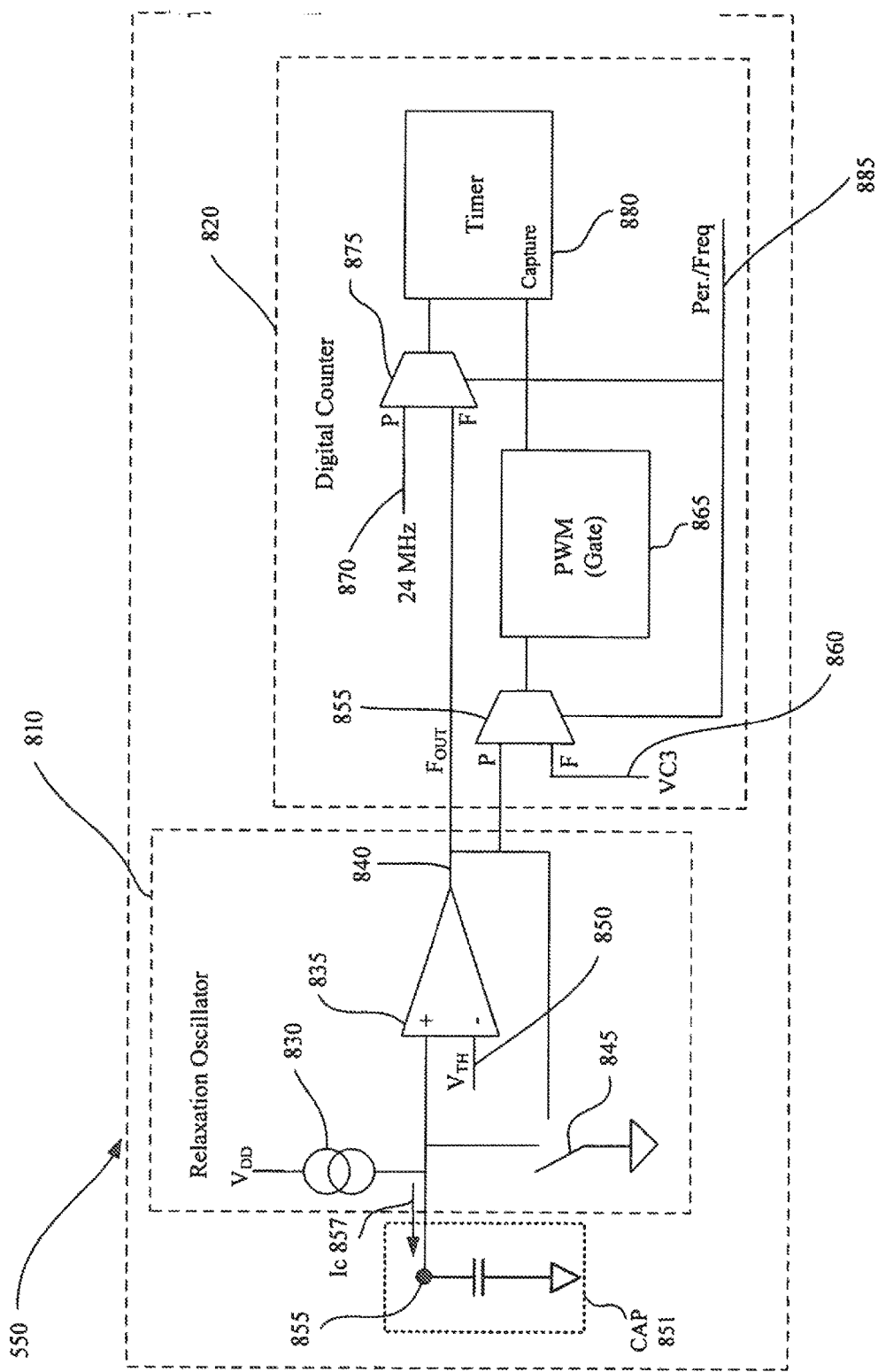
FIG. 8 illustrates a capacitance sensor of the user location discriminating apparatus of FIG. 5 in accordance with one embodiment of the present invention.

In one embodiment, capacitance sensor 550 is a capacitance sensing relaxation oscillator (CSR), such as illustrated in and described with respect to FIG. 8. The CSR may be coupled to an array of sensor elements, an analog multiplexer, digital counting functions, and high-level software routines to compensate for environmental and physical sensor element variations. The sensor array may include combinations of independent sensor elements, sliding sensor elements (e.g., touch-sensor slider), and touch-sensor sensor element pads (e.g., touch pad or touch screen) implemented as a pair of orthogonal sliding sensor elements. The CSR may include physical, electrical, and software components. The physical components may include the physical sensor element itself, typically a pattern constructed on a printed circuit board (PCB) with an insulating cover, a flexible membrane, or a transparent overlay. The electrical component may include an oscillator or other means to convert a capacitance into a measured value. The electrical component may also include a counter or timer to measure the oscillator output. The software component may include detection and compensation algorithms to convert the count value into a sensor element detection decision (also referred to as switch detection decision). For example, in the case of slider sensor elements or X-Y sensor element pads, a calculation for finding the position of the conductive object to greater resolution than the physical pitch of the sensor elements may be used.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, sigma-delta modulators, successive approximation, charge-accumulation circuits, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may require very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 530. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 7A:
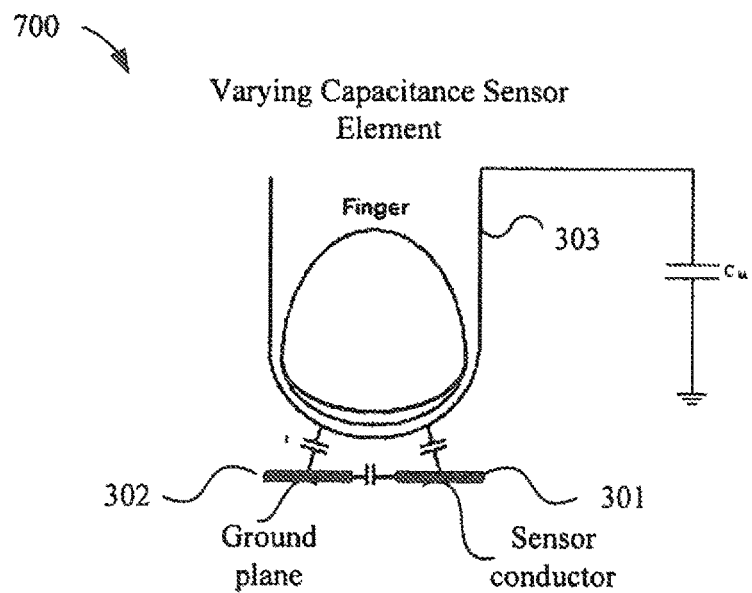
FIG. 7A illustrates a varying capacitance sensor element.

FIG. 7A illustrates a varying capacitance sensor element. In its basic form, a capacitance sensor element 700 is a pair of adjacent conductors 701 and 702. There is a small edge-to-edge capacitance, but the intent of sensor element layout is to minimize the parasitic capacitance $C_P$ between these conductors. When a conductive object 703 (e.g., finger) is placed in proximity to the two conductors 701 and 702, there is a capacitance between electrode 701 and the conductive object 703 and a similar capacitance between the conductive object 703 and the other electrode 702. The capacitance between the electrodes when no conductive object 703 is present is the base capacitance $C_P$ that may be stored as a baseline value. There is also a total capacitance ($C_P+C_F$) on the sensor element 700 when the conductive object 703 is present on or in close proximity to the sensor element 700. The baseline capacitance value $C_P$ may be subtracted from the total capacitance when the conductive object 703 is present to determine the change in capacitance (e.g., capacitance variation $C_F$) when the conductive object 703 is present and when the conductive object 703 is not present on the sensor element. Effectively, the capacitance variation $C_F$ can be measured to determine whether a conductive object 703 is present or not (e.g., sensor activation) on the sensor element 700.

Capacitance sensor element 700 may be used in a capacitance sensor array. The capacitance sensor array is a set of capacitors where one side of each capacitor is connected to a system ground. When the capacitance sensor element 700 is used in the sensor array, when the conductor 701 is sensed, the conductor 702 is connected to ground, and when the conductor 702 is sensed, the conductor 701 is connected to ground. Alternatively, when the sensor element is used for a touch-sensor button, the conductor 701 is sensed and the conductor 702 is connected to ground. The presence of the conductive object 703 increases the capacitance ($C_P+C_F$) of the sensor element 700 to ground. Determining sensor element activation is then a matter of measuring the change in the capacitance ($C_F$) or capacitance variation. Sensor element 700 is also known as a grounded variable capacitor.

The conductive object 703 in this embodiment has been illustrated as a finger. Alternatively, this technique may be applied to any conductive object, for example, a conductive door switch, position sensor, or conductive pen in a stylus tracking system (e.g., stylus).

The capacitance sensor element 700 is known as a projected capacitance sensor. Alternatively, the capacitance sensor element 700 may be a surface capacitance sensor that does not make use of rows or columns, but instead makes use of a single linearized field, such as the surface capacitance sensor described in U.S. Pat. No. 4,293,734. The surface capacitance sensor may be used in touch screen applications.

Figure 7B:
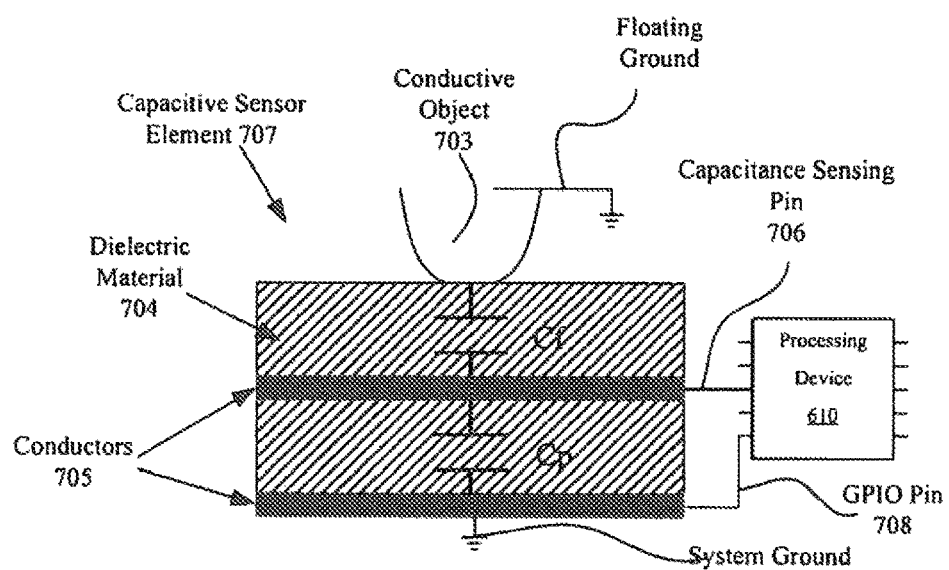
FIG. 7B illustrates one embodiment of a sensing device coupled to a processing device.

FIG. 7B illustrates one embodiment of a capacitance sensor element 707 coupled to a processing device 530. Capacitance sensor element 707 illustrates the capacitance as seen by the processing device 530 on the capacitance sensing pin 706. As described above, when a conductive object 703 (e.g., finger) is placed in proximity to one of the conductors 705, there is a capacitance, $C_F$, between the one of the conductors 705 and the conductive object 703 with respect to ground. This ground, however, may be a floating ground. Also, there is a capacitance, $C_P$, between the conductors 705, with one of the conductors 705 being connected to a system ground. The ground conductor may be coupled to the processing device 530 using GPIO pin 708. The conductors 705 may be metal, or alternatively, the conductors may be conductive ink (e.g., carbon ink), conductive ceramic (e.g., transparent conductors of indium tin oxide (ITO)), conductive polymers, or the like. In one embodiment, the ground conductor is an adjacent sensor element. Alternatively, the ground conductor may be other grounding mechanisms, such as a surrounding ground plane. Accordingly, the processing device 530 can measure the change in capacitance, capacitance variation $C_F$, as the conductive object is in proximity to one of the conductors 705. Above and below the conductor that is closest to the conductive object 703 is dielectric material 704. The dielectric material 704 above the conductor 705 can be an overlay. The overlay may be non-conductive material used to protect the circuitry from environmental conditions and electrostatic discharge (ESD), and to insulate the user's finger (e.g., conductive object) from the circuitry. Capacitance sensor element 707 may be a sensor element of a touch screen, a touch-sensor pad, a touch-sensor slider, a touch-sensor button, or the like.

FIG. 8 illustrates a capacitance sensor of the user location discriminating apparatus of FIG. 5 in accordance with one embodiment of the present invention. The capacitance sensor 550 of FIG. 8 includes a relaxation oscillator 810 coupled to the sensor element (designated as capacitor 851) of a user interface, and to a digital counter 820. The relaxation oscillator 810 is formed by the capacitance to be measured on the capacitor 851, a charging current source 830, a comparator 835, and a reset switch 845 (also referred to as a discharge switch). It should be noted that capacitor 851 is representative of the capacitance measured on a sensor element of the user interface. The relaxation oscillator is coupled to drive a charging current (Ic) 857 in a single direction onto a device under test ("DUT") capacitor, capacitor 851. As the charging current piles charge onto the capacitor 851, the voltage across the capacitor increases with time as a function of Ic 857 and its capacitance C. Equation (2) describes the relation between current, capacitance, voltage, and time for a charging capacitor.

$$CdV = I_C dt \qquad (2)$$

The relaxation oscillator begins by charging the capacitor 851, at a fixed current Ic 857, from a ground potential or zero voltage until the voltage across the capacitor 851 at node 855 reaches a reference voltage or threshold voltage, $V_{TH}$ 850. At the threshold voltage $V_{TH}$ 850, the relaxation oscillator allows the accumulated charge at node 855 to discharge (e.g., the capacitor 851 to "relax" back to the ground potential) and then the process repeats itself. In particular, the output of comparator 835 asserts a clock signal $F_{OUT}$ 840 (e.g., $F_{OUT}$ 840 goes high), which enables the reset switch 845. This discharges the capacitor at node 855 to ground and the charge cycle starts again. The relaxation oscillator outputs a relaxation oscillator clock signal ($F_{OUT}$ 840) having a frequency ($f_{RO}$) dependent upon capacitance C of the capacitor 851 and charging current Ic 857.

The comparator trip time of the comparator 835 and reset switch 845 add a fixed delay. The output of the comparator 835 is synchronized with a reference system clock to guarantee that the reset time is long enough to completely discharge capacitor 851. This sets a practical upper limit to the operating frequency. For example, if capacitance C of the capacitor 851 changes, then $f_{RO}$ changes proportionally according to Equation (2). By comparing $f_{RO}$ of $F_{OUT}$ 840 against the frequency ($f_{REF}$) of a known reference system clock signal (REF CLK), the change in capacitance ΔC can be measured. Accordingly, equations (3) and (4) below describe that a change in frequency between $F_{OUT}$ 840 and REF CLK is proportional to a change in capacitance of the capacitor 851.

$$\Delta C \propto \Delta f, \text{ where} \quad (3)$$

$$\Delta f = f_{RO} - f_{REF}. \quad (4)$$

In one embodiment, a frequency comparator may be coupled to receive relaxation oscillator clock signal ($F_{OUT}$ 840) and REF CLK, compare their frequencies $f_{RO}$ and $f_{REF}$, respectively, and output a signal indicative of the difference Δf between these frequencies. By monitoring Δf one can determine whether the capacitance of the capacitor 851 has changed.

In one exemplary embodiment, the relaxation oscillator 810 may be built using a programmable timer (e.g., 555 timer) to implement the comparator 835 and reset switch 845. The capacitor charging current for the relaxation oscillator 810 may be generated in a register programmable current output DAC (also known as IDAC). Accordingly, the current source 830 may be a current DAC or IDAC. The IDAC output current may be set by an 8-bit value provided by the processing device 530, such as from the processing core 602. The 8-bit value may be stored in a register, in memory, or the like. Alternatively, the relaxation oscillator 810 may be built using other circuitry. Relaxation oscillators are known by those of ordinary skill in the art, and accordingly, additional details regarding their operation have not been included so as to not obscure the present embodiments.

In many capacitance sensor element designs, the two "conductors" (e.g., 701 and 702) of the sensing capacitor are actually adjacent sensor elements that are electrically isolated (e.g., PCB pads or traces), as indicated in FIG. 7A. Typically, one of these conductors is connected to a system ground. Layouts for the touch-sensor slider (e.g., linear slide sensor elements) and touch-sensor pad applications have sensor elements that may be immediately adjacent. In these cases, all of the sensor elements that are not active are connected to a system ground through the GPIO 607 of the processing device 530 dedicated to that pin. The actual capacitance between adjacent conductors is small ($C_P$), but the capacitance of the active conductor (and its PCB trace back to the processing device 530) to ground, when detecting the presence of the conductive object 703, may be considerably higher ($C_P+C_F$). The capacitance of two parallel conductors is given by the following equation:

$$C = \varepsilon_0 \cdot \varepsilon_R \cdot \frac{A}{d} = \varepsilon_R \cdot 8.85 \cdot \frac{A}{d} \text{pF/m} \quad (4)$$

The dimensions of equation (4) are in meters. This is a very simple model of the capacitance. The reality is that there are fringing effects that substantially increase the sensor element-to-ground (and PCB trace-to-ground) capacitance.

There is some variation of sensor element sensitivity as a result of environmental factors. A baseline update routine, which compensates for this variation, may be provided in the high-level APIs.

As described above with respect to the relaxation oscillator 810, when a finger or conductive object is placed on the sensor element, the capacitance increases from $C_P$ to $C_P+C_F$ so the relaxation oscillator output signal 840 ($F_{OUT}$) decreases in frequency. The relaxation oscillator output signal 840 ($F_{OUT}$) may be fed to a digital counter 620 for measurement. The digital counter 420 receives the relaxation oscillator output signal 840 ($F_{OUT}$) and counts at least one of a frequency or a period of the relaxation oscillator output received from the relaxation oscillator. There are two methods for counting the relaxation oscillator output signal 840: frequency measurement and period measurement.

In one embodiment, the digital counter 820 includes two multiplexers 855 and 875. Multiplexers 855 and 875 are configured to select the inputs for the pulse width modulator (PWM) 865 and the timer 880 for the two measurement methods, frequency, and period measurement methods. Alternatively, other selection circuits may be used to select the inputs for the PWM 865 and the timer 880. In another embodiment, multiplexers 855 and 880 are not included in the digital counter, for example, the digital counter 820 may be configured in one, or the other, measurement configuration.

In the frequency measurement method, the relaxation oscillator output signal 840 is counted for a fixed period of time. The timer 880 (e.g., counter) is read to obtain the number of counts during the gate time. This method works well at low frequencies where the oscillator reset time is small compared to the oscillator period. A PWM 865 is clocked for a fixed period by a derivative of the system clock, VC3 860 (which is a divider from the 24 MHz system clock 870). Pulse width modulation is a modulation technique that generates variable-length pulses to represent the amplitude of an analog input signal; in this case VC3 860. The output of PWM 865 enables the timer 880 (e.g., 16-bit). The relaxation oscillator output signal 840 clocks the timer 880. The timer 880 is reset at the start of the sequence, and the count value is read out at the end of the gate period.

In the period measurement method, the relaxation oscillator output signal 840 gates a timer 880 (e.g., counter), which is clocked by the system clock 870 (e.g., 24 MHz). In order to improve sensitivity and resolution, multiple periods of the oscillator are counted with the PWM 865. The output of PWM 865 is used to gate the timer 880. In this method, the relaxation oscillator output signal 840 drives the clock input of PWM 865. As previously described, pulse width modulation is a modulation technique that generates variable-length pulses to represent the amplitude of an analog input signal; in this case the relaxation oscillator output signal 840. The output of the PWM 865 enables the timer 880 (e.g., 16-bit), which is clocked at the system clock frequency 870 (e.g., 24 MHz). When the output of PWM 865 is asserted (e.g., goes high), the count starts by releasing the capture control of the timer 880. When the terminal count of the PWM 865 is reached, the capture signal is asserted (e.g., goes high), stopping the count and setting the PWM's interrupt. The timer value is read in this interrupt. The relaxation oscillator 810 is indexed to the next switch (e.g., next sensor element in the user interface) to be measured and the count sequence is started again.

Additional details of the relaxation oscillator and digital counter are known by those of ordinary skill in the art, and accordingly, a detailed description regarding them has not been included. It should also be noted, that the embodiments described herein are not limited to using relaxation oscillators, but may include other sensing circuitry for measuring capacitance, such as versus voltage phase shift measurement, resistor-capacitor charge timing, capacitive bridge divider, charge transfer, sigma-delta modulators, charge-accumulation circuits, successive approximation, or the like.

FIG. 9A illustrates a graph of a sensitivity of a single touch-sensor button. Graph 900 includes the counts 952 as measured on a single touch-sensor button for "no presence" 950 on the touch-sensor button, and for a "presence" 951 on the touch-sensor button. In one embodiment, when the "presence" 951 is detected, a button activation is determined. The "No presence" 950 occurs when the user interface does not detect the presence of the conductive object. The "No presence" 950 is detected between a range of noise. The range of noise may include a positive noise threshold 947 and a negative noise threshold 948. So long as the counts 952 are measured as being between the positive and negative thresholds 947 and 948, the user interface detects "no presence" 950. The "presence" 951 is when the user interface detects the presence of the conductive object (e.g., finger). The "Presence" 951 is detected when the counts 952 are greater than a presence threshold 945. The presence threshold 945 indicates that a presence of a conductive object is detected on the user interface during touch-activation sensing. The sensitivity 949 (Cf/$C_P$) of the single button operation is such that when it detects the presence of the conductive object, the capacitance variation (Δn) is above the presence threshold 945. The sensitivity 949 may have a range, sensitivity range 946. Sensitivity range 946 may have a lower and upper limit or threshold. The lower threshold is equal to or greater than the presence threshold 945, allowing a "presence" 951 to be detected on or in proximity to the touch-sensor button. The user interface may be configured such that there is a design margin between the presence threshold 945 and the positive noise threshold 947. The sensitivity range 946 is based on the surface area of the touch-sensor button, as well as other factors.

Although FIG. 9A is usually representative of the sensitivity of a single touch-sensor button, FIG. 9A may also illustrate the sensitivity of a group of coupled sensor elements. It should also be noted that the values of parameters in the graph of FIG. 9A may be different for the different configurations. For example, in scanning a sensor element individually, the presence threshold 945 may be set to have an arbitrary count of 100 counts, based on factors such as scan speed, surface area, and the like. It should be noted in this embodiment, separate baseline measurement can be made for each of the sensor elements that are being measured individually, and the capacitance on a particular sensor element is compared against a presence threshold, such as the presence threshold 945, to determine if the particular sensor element has been activated. However, using the same hardware (e.g., sensor elements, ground conductors, capacitance sensing pins, processing device, and the like), in scanning the group of coupled sensor elements, the presence threshold may be set to have a similar or dissimilar presence threshold, for example, a lower count than the 100 counts used in the other configuration. Alternatively, other thresholds may be set for the different configurations, such as for the button-activation sensing or the proximity sensing.

Figure 9B:
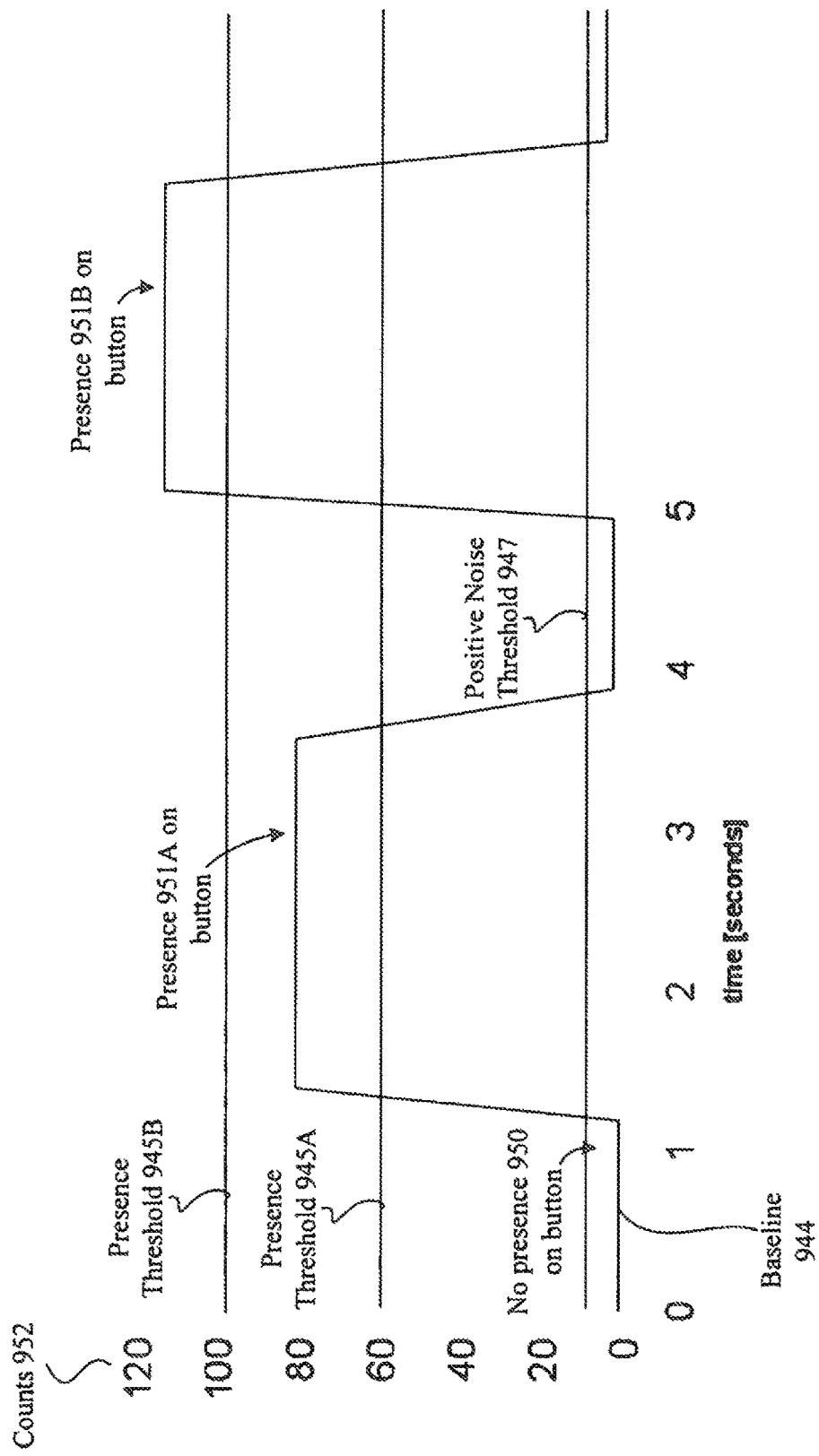
FIG. 9B illustrates a graph of the sensitivity of one embodiment of single touch-sensor button activated by two users in two locations.

FIG. 9B illustrates a graph of the sensitivity of one embodiment of single touch-sensor button activated by two users in two locations. Graph 950 includes the counts 852 as measured on a single touch-sensor button for "no presence" 950 on the touch-sensor button, for a first "presence" 951A on the touch-sensor button, and for a second "presence" 951B on the touch-sensor button. In one embodiment, when the first "presence" 951A is detected, a button activation from a first user at the first location is determined, and when the second "presence" 951B is detected, a button activation from a second user at the second location is determined. In another embodiment, when the first "presence" 951A is detected, a button activation from a first user at the first location is determined, and when the second "presence" 951B is detected, a button activation from a first user at the second location. The "No presence" 950 occurs when the user interface does not detect the presence of the conductive object of a user at either location. The "No presence" 950 is detected between a range of noise, as described above. So long as the counts 952 are measured as being between below the presence threshold 945A, no user interface detects "no presence" 950. The first "presence" 951A is when the user interface detects the presence of the conductive object (e.g., finger) at the first location. The first "presence" 951A is detected when the counts 952 are greater than a first presence threshold 945A, but below a second presence threshold 945B. The second "presence" 951B is when the user interface detects the presence of the conductive object (e.g., finger) at the second location. The second "presence" 951B is detected when the counts 952 are greater than the second presence threshold 945B. The first and second presence thresholds 945A and 945B indicate that a presence of a conductive object is detected on the user interface during touch-activation sensing. Alternatively, the presence thresholds may be tuned to other values in discriminating between interaction at the first location and the second location.

Although FIG. 9B is usually representative of the sensitivity of a single touch-sensor button, FIG. 9B may also illustrate the sensitivity of a group of coupled sensor elements. It should also be noted that the values of parameters in the graph of FIG. 9B may be different for the different configurations, as described above. It should be noted in this embodiment, separate baseline measurement can be made for each of the sensor elements that are being measured individually, and the capacitance on a particular sensor element is compared against a presence threshold, such as the presence threshold 945A or 945B, to determine if the particular sensor element has been activated. Alternatively, other thresholds may be set for the different configurations, such as for button-activation sensing or proximity sensing.

Figure 10:
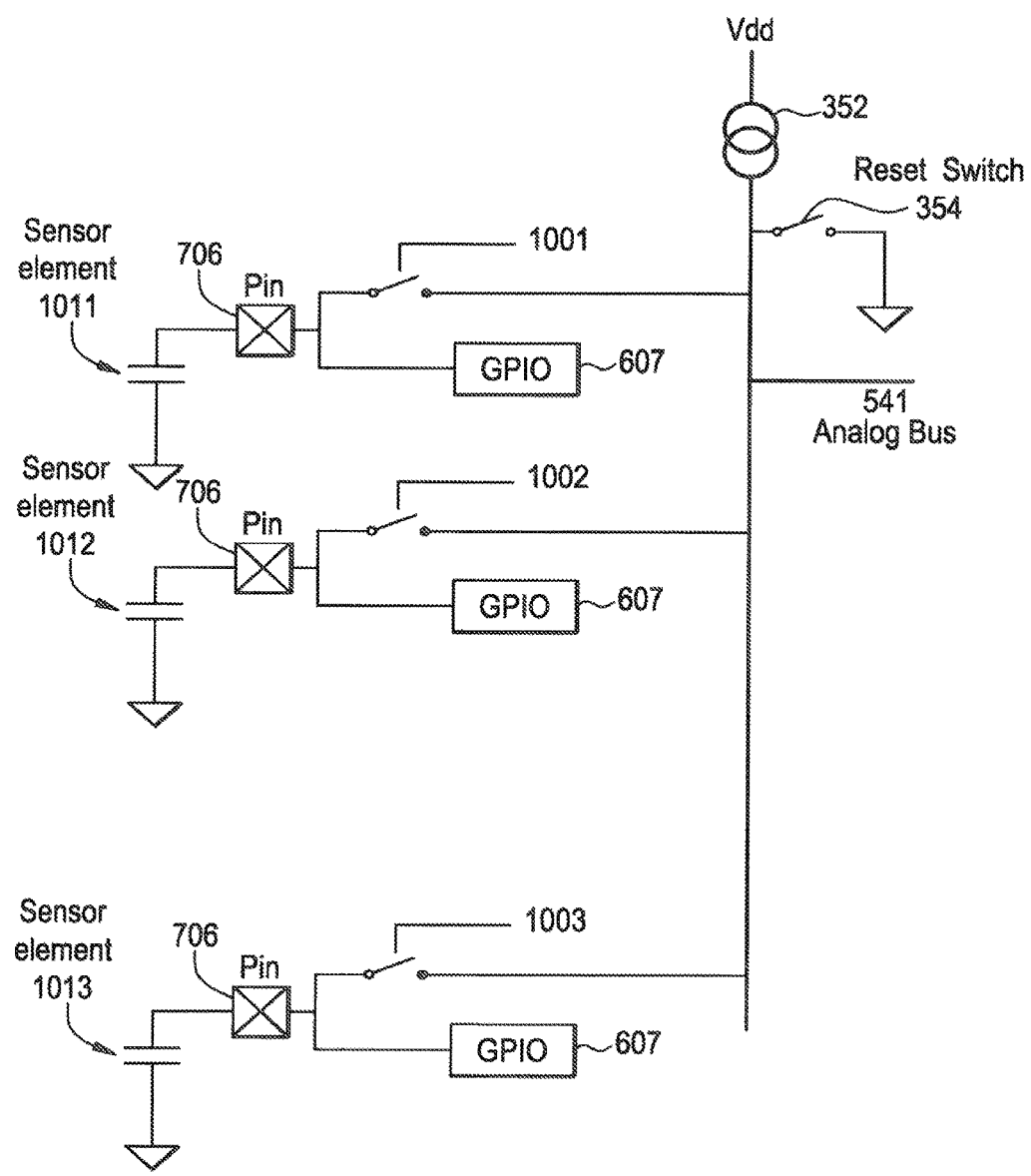
FIG. 10 illustrates one embodiment of a selection circuit coupled to an analog bus for measuring capacitance on the sensor elements.

FIG. 10 illustrates one embodiment of a selection circuit 540 coupled to an analog bus 541 for measuring capacitance on the sensor elements 1004 and 1005. As previously described, the selection circuit 540 is coupled to the sensor elements and ground conductor via capacitance sensing pins 706, current source 830, reset switch 845, and a comparator 835 (not illustrated in FIG. 10) via analog bus 541. The selection circuit 540 may be configured to sequentially select a sensor element of the multiple sensor elements 1004 and 1005 to provide the charge current and to measure the capacitance of each sensor element 1004 and 1005, individually. In another embodiment, the sensor elements 1004 and 1005 are selected and coupled together to provide the charge current and to measure a collective capacitance on the coupled sensor elements 904 and 905. Alternatively, the selection circuit 540 may be configured to couple any combination of sensor elements (and ground conductors) to the system ground of the processing device 530.

It should be noted that although the selection circuit 540 is illustrated and described with respect to a relaxation oscillator having the current source 830, reset switch 845, and comparator 835, alternatively, the selection circuit 540 is implemented with other types of circuits for measuring capacitance, such as a circuit that includes the sigma-delta modulator, or other types of capacitance measuring circuits, such as current versus voltage phase shift measurement, resistor-capacitor charge timing, capacitive bridge divider, charge transfer, successive approximations, charge-accumulation circuits, or the like.

In one exemplary embodiment, the selection circuit 540 is a multiplexer array of the relaxation oscillator 810. Alternatively, selection circuit 540 may be other circuitry outside the relaxation oscillator 810, or even outside the capacitance sensor 550 to select the sensor element to be measured. The selection circuit 540 may also be used to ground the sensor elements that are not being measured. This may be done in conjunction with a dedicated pin in the GPIO port 607. The selection circuit 540 may also be used to couple all the sensor elements 904 and 905 (and/or ground conductor 903) at the same time. Alternatively, the processing device 530 may sequentially or simultaneously scan each of the sensor elements individually. The processing device 530 can select the sensor elements 904, 905, and 903 using selection control lines 1001, 1002, and 1003, respectively.

Figure 11:
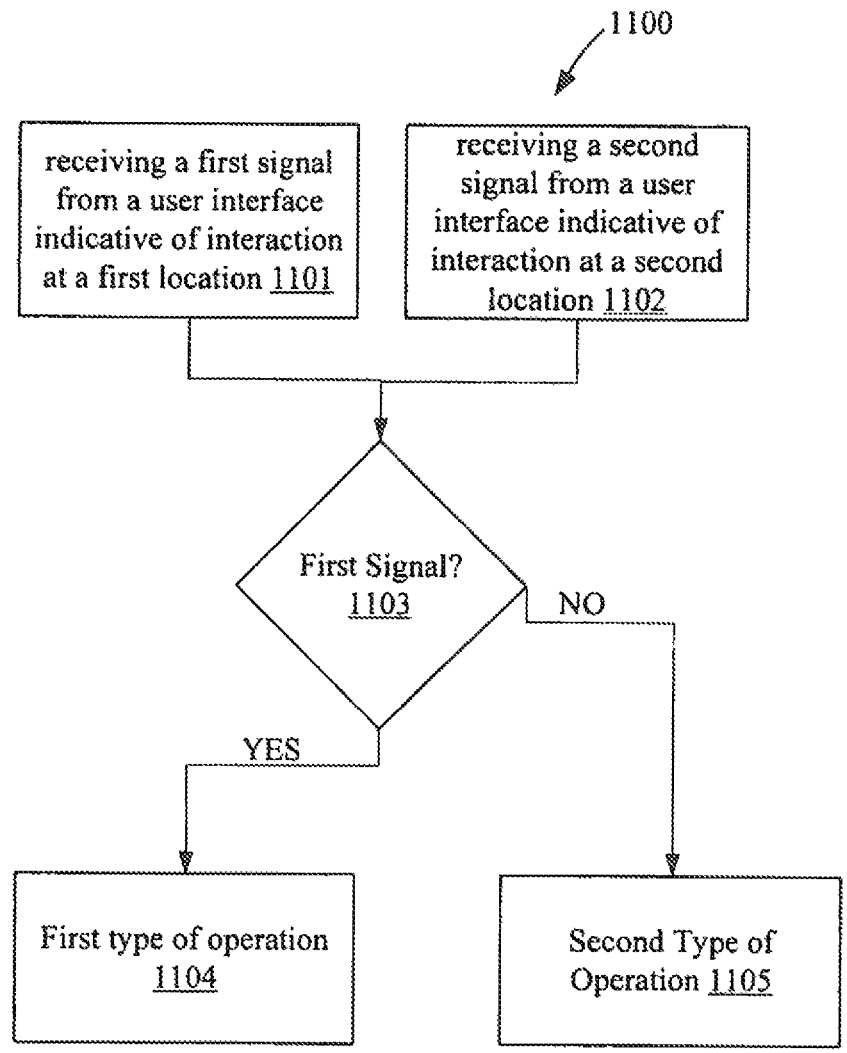
FIG. 11 illustrates a flowchart of one embodiment of a method for discriminating between a first signal indicative of interaction at a first location and a second signal indicative of interaction at a second location.

FIG. 11 illustrates a flowchart of one embodiment of a method 1100 for discriminating between a first signal indicative of interaction at a first location and a second signal indicative of interaction at a second location. The method 1100 includes receiving a first signal from a user interface indicative of interaction at a first location, in operation 1101. The method 1100 also includes receiving a second signal from a user interface indicative of interaction at a second location, in operation 1102. The method 1100 also includes discriminating between the first signal and the second signal corresponding to the first location and the second location, respectively, by determining whether the received signal is the first signal, in operation 1103. If the received signal is the first signal, a first type of operation is performed, in operation 1104. However, if the received signal is not the first signal, then a second type of operation is performed, in operation 1105. By discriminating between the first and second signals, user interaction of a first user at a first location can be discriminated from user interaction of a second user (or alternatively, the first user) at the second location. Once the method has discriminated between the first and second signals, different (or similar) operations of the user interface can be performed in response. It should be noted that the second signal may have a zero value. When discriminating between the first signal and the second signal, the method discriminates the first signal as corresponding to a first user at a first location when the second signal is a zero value. For example, in the car driver case, the presence of the first signal is detected and the value of the signal is detected as a zero value, the method determines that the driver is operating the UI, and thus locks out access to certain UI functions, such as while the car is in motion. In another embodiment, the second signal would always be set to a defined value, such as a zero value, so that the certain UI functions would be allowed only if the second signal were detected at a value other than zero.

In one embodiment, the operation of discriminating between the first and second signals includes generating the first signal with a first frequency, such as by a first drive circuit, at a first location, and generating the second signal with a second frequency, such as by the first drive circuit or a second drive circuit, at a second location. The first and second frequencies are measured to discriminate between the first and second signals. The method may further include applying the generated first signal to a body of a first user at the first location and the generated second signal to a body of a second user (or the body of the first user) at the second location. By applying the first signal to the body of the first user at the first location, the first signal is propagated through the body of the first user to the user interface when the first user interacts with the user interface at the first location. Similarly, by applying the second signal to the body of the second user (or first use) at the second location, the second signal is propagated through the body of the second user to the user interface when the second user interacts with the user interface at the second location.

In another embodiment, the operation of discriminating between the first and second signals includes generating a first signal with a first frequency at the first location and generating the second signal with the same frequency as the first frequency at the second location. The signals are applied to the bodies at the respective locations at different points in time. For example, after the first signal has been applied to the user at the first location, the method attempts to detect the first signal through the user at the first location. However, if the first signal is not detected, then the second signal is applied to the user at the second location, and the method attempts to detect the second signal through the user at the second location.

In another embodiment, the operation of discriminating between the first and second signals includes generating a carrier signal having the carrier frequency at the first and second locations, and modulating onto the carrier signal, at the respective locations, the first signal with a first frequency corresponding to the first location and the second signal with a second frequency corresponding to the second location. The method includes an operation to receive the carrier signal having the carrier frequency and to demodulate the carrier signal to discriminate between the first and second signals corresponding to the first location and the second location, respectively. The operation of demodulating may include demodulating the carrier signal to detect either the first frequency or the second frequency to discriminate between the first and second signals.

In another embodiment, the operation of discriminating between the first and second signals includes determining a first capacitance of a first user at the first location from the first signal corresponding to the first location and a second capacitance of a second user at the second location from the second signal corresponding to the second location. The method further includes discriminating between interaction of the first user and the second user based on the determined first and second capacitances. In one embodiment, a first count, representative of the first capacitance (e.g., first signal) of the first user at the first location, is measured. A second count, representative of the second capacitance (e.g., second signal) of the second user (or first user) at the second location, is measured. The method further includes an operation to discriminate between interaction of the first and second users at the first and second locations based on the first and second counts.

In another embodiment, the method 1100 further includes providing a display that is configured to display a first image to a first user in the first location and a second image to a second user in the second location. For example, the display is configured to display two different images displayed at two different viewing angles (e.g., to display a navigation system to the driver and a movie to the passenger). The user interface (e.g., touch screen) controls may be user sensitive, so that the user interface provides functions, such as pause, fast forward, etc., to the passenger, while the user interface provides navigation functions. In one embodiment, the functions for the different users are provided in the same touch screen. In another embodiment, the functions are provided on the same touch screen buttons located at the same place on the touch screen. The method includes an operation that can detect a first type of interaction by the first user with the user interface at the first location, as well as detect a second type of interaction by the second user with the user interface at the second location. When the first type of interaction is detected at the first location, the method performs a first type of operation. In response to detecting the second type of interaction at the second location, a second type of operation is performed. In another embodiment, the method includes limiting operation of the user interface at the first location, while allowing interaction with the user interface at the second location. In one embodiment, to limit operation in the first location, the method includes preventing a first type of interaction at the first location. However, the first type of interaction at the second location is allowed. For example, the driver at the first location may be prevented from accessing navigation functions while the car is in motion, but the passenger at the second location may be allowed to access these same functions.

The embodiments described herein may be configured to have the ability to limit an operator in certain locations from interacting with a user interface of the device. The embodiments described herein may also be configured to have the ability to provide one type of interaction with a user in location, and a different interaction for another user (or the same user) at a different location. For example, a first user at a first location may be a user in the driver seat of a car, while a second user at a second location may be a user in the passenger seat of a car. The embodiments described herein are configured to determine who has pressed a button in order to, for example, prevent the driver from accessing navigation functions while the car is in motion, but allow the passenger to operate those same controls.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A car entertainment and navigation system comprising:
a user interface controller configured to output graphical display data to a touch screen display of a car; and
a detecting circuit coupled to the user interface controller, the detecting circuit comprising:
capacitance-sensing circuitry coupled to a plurality of electrodes of the touch screen display, the capacitance-sensing circuitry to determine a location of a touch proximate to one or more electrodes of the plurality of electrodes based on capacitance measurements of the plurality of electrodes of the touch screen display made during a first mode of operation of the detecting circuit; and
user-detecting circuitry coupled to the one or more electrodes, the user-detecting circuitry to determine a location of a user corresponding to the same touch proximate to the same one or more electrodes of the plurality of electrodes based on signal measurements of a capacitively-coupled signal at the one or more electrodes made by the same touch proximate to the same one or more electrodes of the plurality of electrodes during a second mode of operation of the detecting circuit.

2. The car entertainment and navigation system of claim 1, wherein the detecting circuit is configured to receive a signal from a device coupled to the car entertainment and navigation system and determine that the car is in motion based on the signal.

3. The car entertainment and navigation system of claim 1, wherein the detecting circuit is configured to receive a signal from a car system and determine a state of the car based on the signal.

4. The car entertainment and navigation system of claim 1, wherein the user-detecting circuitry further comprises a frequency detector circuit to detect a frequency of the capacitively-coupled signal.

5. The car entertainment and navigation system of claim 4, wherein the frequency detector circuit comprises a phase-locked loop (PLL).

6. The car entertainment and navigation system of claim 5, wherein the frequency detector circuit further comprises an amplifier coupled to the PLL.

7. The car entertainment and navigation system of claim 4, wherein the frequency detector circuit comprises a demodulator that is configured to demodulate a carrier frequency to detect a modulated frequency on the carrier frequency, wherein the modulated frequency corresponds to a specific location of the user.

8. The car entertainment and navigation system of claim 1, wherein the first mode is a touch sensing mode and the second mode is a user sensing mode, wherein, when the touch is detected proximate to the one or more electrodes in the touch sensing mode, the same one or more electrodes are reconfigured to sense the capacitively-coupled signal in the user sensing mode.

9. The car entertainment and navigation system of claim 1, wherein the capacitance-sensing circuitry and the user-detecting circuitry operate sequentially in the first mode and the second mode, respectively.

10. The car entertainment and navigation system of claim 1, further comprises a selection circuit configurable to selectively couple the capacitance-sensing circuitry to the one or more electrodes in the first mode and selectively couple the user-detecting circuitry to the one or more electrodes in the second mode.

11. The car entertainment and navigation system of claim 10, wherein the capacitance-sensing circuitry comprises a single capacitance sensor coupled to the selection circuit.

12. The car entertainment and navigation system of claim 11, wherein the single capacitance sensor comprises at least one of a relaxation oscillator, a sigma-delta modulation circuit, a successive approximation circuit, a voltage phase shift measurement circuit, a resistor-capacitor charge timing circuit, a capacitive bridge divider circuit, a charge transfer circuit, or a charge-accumulation circuit.

13. The car entertainment and navigation system of claim 10, wherein the capacitance-sensing circuitry comprises a plurality of capacitance sensors coupled to the selection circuit.

14. The car entertainment and navigation system of claim 1, wherein the user interface controller comprises a logic block configured to receive a digital code from the capacitance-sensing circuitry and an indication of the location of the user from the user-detecting circuitry, wherein the indication of the location is either a driver seat of the car or a passenger seat of the car.

15. The car entertainment and navigation system of claim 14, wherein the logic block is configured to receive a signal from a device coupled to the car entertainment and navigation system and determine that the car is in motion based on the signal.

16. An integrated circuit comprising:
 capacitance-sensing circuitry to determine a location of a touch proximate to one or more electrodes of a plurality of electrodes based on capacitance measurements of the plurality of electrodes of a touch screen made during a first mode of operation of the integrated circuit; and
 user-detecting circuitry to determine a location of a user corresponding to the same touch proximate to the one or more electrodes based on signal measurements of a capacitively-coupled signal at the one or more electrodes made by the same touch proximate to the same one or more electrodes of the plurality of electrodes during a second mode of operation of the integrated circuit; and
 a multiplexer coupled to the capacitance-sensing circuitry and the user-detecting circuitry, wherein multiplexer is configurable to selectively couple the capacitance-sensing circuitry to the plurality of electrodes during the first mode and selectively coupling the user-detecting circuitry to the one or more electrodes during the second mode.

17. The integrated circuit of claim 16, further comprising a user interface controller coupled to the capacitance-sensing circuitry and the user-detecting circuitry, wherein the user interface controller is configured to receive a signal from a device coupled to the integrated circuit and determine that a car is in motion based on the signal.

18. A touch screen device comprising:
 a touch screen display comprising electrodes and display elements;
 a processing device coupled to the touch screen display, wherein the processing device comprises:
  a user interface controller coupled to the touch screen display;
  a detecting circuit coupled to the user interface controller, the detecting circuit comprising a capacitance measurement circuit and a user-detector circuit; and
  a selection circuit coupled to the detecting circuit, wherein the selection circuit is configurable to selectively couple the capacitance measurement circuit to one or more of the electrodes during a first mode and selectively couple the user-detector circuit to the one or more electrodes during a second mode, wherein:
  the capacitance measurement circuit is configured to determine a location of a touch proximate to the one or more electrodes of a plurality of electrodes based on capacitance measurements made during the first mode; and
  the user-detector circuit is configured to determine a location of a user corresponding to the same touch based on signal measurements of a capacitively-coupled signal at the same one or more electrodes of the plurality of electrodes made during the second mode.

19. The touch screen device of claim 18, wherein the processing device is configured to control a first drive circuit located at a driver seat of a car and a second drive circuit located at a passenger seat of the car.

20. The touch screen device of claim 18, wherein the detecting circuit is configured to receive a signal from a speedometer and determine that a car is in motion based on the signal.

* * * * *

UNITED STATES PATENT AND TRADEMARK OFFICE
CERTIFICATE OF CORRECTION

PATENT NO. : 10,437,381 B2
APPLICATION NO. : 15/849204
DATED : October 8, 2019
INVENTOR(S) : David G. Wright It is certified that error appears in the above-identified patent and that said Letters Patent is hereby corrected as shown below:

On the Title Page

Assignee, "Cyrpress Semiconductor Corporation, San Jose, CA (US)" to read as --Cypress Semiconductor Corporation, San Jose, CA (US)--.

Signed and Sealed this
Nineteenth Day of November, 2019

Andrei Iancu
*Director of the United States Patent and Trademark Office*